US008264355B2

(12) United States Patent
Kozischek et al.

(10) Patent No.: US 8,264,355 B2
(45) Date of Patent: Sep. 11, 2012

(54) RFID SYSTEMS AND METHODS FOR OPTICAL FIBER NETWORK DEPLOYMENT AND MAINTENANCE

(75) Inventors: David Robert Kozischek, Hickory, NC (US); John David Downie, Painted Post, NY (US); Leo Nederlof, Kapelle-Op-Den-Bos (BE); James Scott Sutherland, Corning, NY (US); Mark Peter Taylor, Montour Falls, NY (US); Matthew Scott Whiting, Lawrenceville, PA (US); Richard Edward Wagner, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 694 days.

(21) Appl. No.: 12/248,374

(22) Filed: Oct. 9, 2008

(65) Prior Publication Data
US 2009/0097846 A1  Apr. 16, 2009

Related U.S. Application Data

(63) Continuation of application No. 11/638,812, filed on Dec. 14, 2006, now Pat. No. 7,760,094.

(51) Int. Cl.
*G08B 13/14* (2006.01)
(52) U.S. Cl. ............... 340/572.1; 340/10.51; 340/572.4; 385/100
(58) Field of Classification Search ............... 340/572.1, 340/572.4, 10.1, 10.51; 398/20; 385/100
See application file for complete search history.

(56) References Cited

U.S. PATENT DOCUMENTS

| | | | |
|---|---|---|---|
| 3,052,842 A | 9/1962 | Frohman et al. | |
| 3,609,742 A | 9/1971 | Burdick | |
| 3,771,098 A | 11/1973 | Dempsey | |
| 3,931,574 A | 1/1976 | Curtis, Jr. et al. | |
| 3,942,859 A | 3/1976 | Korodi | |
| 4,019,128 A | 4/1977 | Chebowski | |

(Continued)

FOREIGN PATENT DOCUMENTS

DE  19841738  3/2000

(Continued)

OTHER PUBLICATIONS

Wilson, Brian et al., "Multiwavelength Optical Networking Management and Control," Journal of Lightwave Technology, IEEE Dec. 1, 2000, vol. 18, No. 12, pp. 2038-2057.

(Continued)

*Primary Examiner* — Thomas Mullen
(74) *Attorney, Agent, or Firm* — Joseph M. Homa

(57) ABSTRACT

An optical-fiber-network (OFN) radio-frequency identification (RFID) system for deploying and/or maintaining and/or provisioning service and/or locating faults in an OFN. The system includes a plurality of OFN components, and at least one RFID tag that includes RFID tag data that has at least one property of the OFN component associated with the RFID tag. The RFID tag data is written to and read from the RFID tags using one or more mobile RFID readers either prior to, during or after deploying the OFN components. An OFN-component-data database unit is used to store and process the RFID tag data and is automatically updated by the one or more mobile RFID readers. This allows for different maps of the OFN to be made, such as an inventory map and a maintenance map, and for the maps to be automatically updated. The OFN-RFID system allows for mobile automated operations and management of OFN components by service personnel, and provides for faster and more accurate OFN system deployment and maintenance.

24 Claims, 9 Drawing Sheets

U.S. PATENT DOCUMENTS

| | | |
|---|---|---|
| 4,200,862 A | 4/1980 | Campbell et al. |
| 4,365,238 A | 12/1982 | Kollin |
| 4,418,333 A | 11/1983 | Schwarzbach et al. |
| 4,578,636 A | 3/1986 | Bakke et al. |
| 4,626,633 A | 12/1986 | Ruehl et al. |
| 4,630,886 A | 12/1986 | Lauriello et al. |
| 4,889,977 A | 12/1989 | Haydon |
| 4,915,639 A | 4/1990 | Cohn et al. |
| 4,924,213 A | 5/1990 | Decho et al. |
| 4,937,529 A | 6/1990 | O'Toole, III et al. |
| 4,968,929 A | 11/1990 | Hauck et al. |
| 4,978,317 A | 12/1990 | Pocrass |
| 5,081,627 A | 1/1992 | Yu |
| 5,185,570 A | 2/1993 | Fitzpatrick |
| 5,199,093 A | 3/1993 | Longhurst |
| 5,222,164 A | 6/1993 | Bass, Sr. et al. |
| 5,244,409 A | 9/1993 | Guss, III et al. |
| 5,265,187 A | 11/1993 | Morin et al. |
| 5,297,015 A | 3/1994 | Miyazaki et al. |
| 5,305,405 A | 4/1994 | Emmons et al. |
| 5,337,400 A | 8/1994 | Morin et al. |
| 5,353,367 A | 10/1994 | Czosnowski et al. |
| 5,394,503 A | 2/1995 | Dietz, Jr. et al. |
| 5,418,334 A | 5/1995 | Williams |
| 5,448,675 A | 9/1995 | Leone et al. |
| 5,461,693 A | 10/1995 | Pimpinella |
| 5,473,715 A | 12/1995 | Schofield et al. |
| 5,483,467 A | 1/1996 | Krupka et al. |
| 5,528,222 A | 6/1996 | Moskowitz et al. |
| 5,588,873 A | 12/1996 | Hamai et al. |
| 5,601,451 A | 2/1997 | Driones et al. |
| 5,613,873 A | 3/1997 | Bell, Jr. |
| 5,638,818 A | 6/1997 | Diab et al. |
| 5,645,440 A | 7/1997 | Tobler et al. |
| 5,660,567 A | 8/1997 | Nierlich et al. |
| 5,666,453 A | 9/1997 | Dannenmann |
| 5,685,737 A | 11/1997 | Morin et al. |
| 5,692,925 A | 12/1997 | Bogese, II |
| 5,700,157 A | 12/1997 | Chung |
| 5,704,802 A | 1/1998 | Loudermilk |
| 5,741,152 A | 4/1998 | Boutros |
| 5,764,043 A | 6/1998 | Czosnowski et al. |
| 5,782,757 A | 7/1998 | Diab et al. |
| 5,797,767 A | 8/1998 | Schell |
| 5,821,510 A | 10/1998 | Cohen et al. |
| 5,842,045 A | 11/1998 | Nakamura |
| 5,847,557 A | 12/1998 | Fincher et al. |
| 5,854,824 A | 12/1998 | Bengal et al. |
| 5,876,239 A | 3/1999 | Morin et al. |
| 5,876,240 A | 3/1999 | Derstine et al. |
| 5,885,100 A | 3/1999 | Talend et al. |
| 5,910,776 A | 6/1999 | Black |
| 5,914,862 A | 6/1999 | Ferguson et al. |
| 5,915,993 A | 6/1999 | Belopolsky et al. |
| 5,924,889 A | 7/1999 | Wang |
| 5,934,925 A | 8/1999 | Tobler et al. |
| 5,984,731 A | 11/1999 | Laity |
| 5,995,006 A | 11/1999 | Walsh |
| 5,995,855 A | 11/1999 | Kiani et al. |
| 5,999,400 A | 12/1999 | Belopolsky et al. |
| 6,002,331 A | 12/1999 | Laor |
| 6,025,725 A | 2/2000 | Gershenfeld et al. |
| 6,068,627 A | 5/2000 | Orszulak et al. |
| 6,095,851 A | 8/2000 | Laity et al. |
| 6,095,869 A | 8/2000 | Wang |
| 6,100,804 A | 8/2000 | Brady et al. |
| 6,102,741 A | 8/2000 | Boutros et al. |
| 6,113,422 A | 9/2000 | Somerville et al. |
| 6,116,946 A | 9/2000 | Lewis et al. |
| 6,116,962 A | 9/2000 | Laity |
| 6,118,379 A | 9/2000 | Kodukula et al. |
| 6,120,318 A | 9/2000 | Reed et al. |
| 6,126,610 A | 10/2000 | Rich et al. |
| 6,127,929 A | 10/2000 | Roz |
| 6,133,835 A | 10/2000 | De Leeuw et al. |
| 6,142,822 A | 11/2000 | Wu |
| 6,152,762 A | 11/2000 | Marshall et al. |
| 6,164,551 A | 12/2000 | Altwasser |
| 6,174,194 B1 | 1/2001 | Bleicher et al. |
| 6,217,371 B1 | 4/2001 | Wu |
| 6,222,908 B1 | 4/2001 | Bartolutti et al. |
| 6,222,975 B1 | 4/2001 | Gilbert et al. |
| 6,224,417 B1 | 5/2001 | Belopolsky et al. |
| 6,227,911 B1 | 5/2001 | Boutros et al. |
| 6,232,870 B1 | 5/2001 | Garber et al. |
| 6,234,830 B1 | 5/2001 | Ensz et al. |
| 6,241,550 B1 | 6/2001 | Laity et al. |
| 6,243,654 B1 | 6/2001 | Johnson et al. |
| 6,256,523 B1 | 7/2001 | Diab et al. |
| 6,280,213 B1 | 8/2001 | Tobler et al. |
| 6,285,293 B1 | 9/2001 | German et al. |
| 6,298,255 B1 | 10/2001 | Cordero et al. |
| 6,319,051 B1 | 11/2001 | Chang et al. |
| 6,319,062 B1 | 11/2001 | Ma et al. |
| 6,325,664 B1 | 12/2001 | Someda et al. |
| 6,330,307 B1 | 12/2001 | Bloch et al. |
| 6,349,228 B1 | 2/2002 | Kiani et al. |
| 6,350,148 B1 | 2/2002 | Bartolutti et al. |
| 6,352,446 B2 | 3/2002 | Ezawa et al. |
| 6,354,884 B1 | 3/2002 | Yeh et al. |
| 6,368,155 B1 | 4/2002 | Bassler et al. |
| 6,375,362 B1 | 4/2002 | Heiles et al. |
| 6,377,203 B1 | 4/2002 | Doany |
| 6,378,111 B1 | 4/2002 | Brenner et al. |
| 6,402,743 B1 | 6/2002 | Orszulak et al. |
| 6,409,530 B1 | 6/2002 | Zhao et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,428,361 B1 | 8/2002 | Imschweiler et al. |
| 6,431,906 B1 | 8/2002 | Belopolsky |
| 6,439,922 B1 | 8/2002 | Laurer et al. |
| 6,456,768 B1 | 9/2002 | Boncek et al. |
| 6,457,993 B1 | 10/2002 | Espenshade |
| 6,464,533 B1 | 10/2002 | Ma et al. |
| 6,469,404 B1 | 10/2002 | Pohjola |
| 6,478,610 B1 | 11/2002 | Zhou et al. |
| 6,478,611 B1 | 11/2002 | Hyland |
| 6,496,113 B2 | 12/2002 | Lee et al. |
| 6,496,382 B1 | 12/2002 | Ferguson et al. |
| 6,499,861 B1 | 12/2002 | German et al. |
| 6,522,308 B1 | 2/2003 | Mathieu |
| 6,522,737 B1 | 2/2003 | Bartolutti et al. |
| 6,541,756 B2 | 4/2003 | Schulz et al. |
| 6,543,940 B2 | 4/2003 | Chu |
| 6,556,761 B1 | 4/2003 | Jennings et al. |
| 6,574,586 B1 | 6/2003 | David et al. |
| 6,577,243 B1 | 6/2003 | Dannenmann et al. |
| 6,580,086 B1 | 6/2003 | Schulz et al. |
| 6,618,022 B2 | 9/2003 | Harvey |
| 6,655,988 B1 | 12/2003 | Simmons et al. |
| 6,663,417 B1 | 12/2003 | Hung |
| 6,684,179 B1 | 1/2004 | David |
| 6,685,701 B2 | 2/2004 | Orszulak et al. |
| 6,688,908 B2 | 2/2004 | Wallace |
| 6,688,910 B1 | 2/2004 | Macauley |
| 6,693,513 B2 | 2/2004 | Tuttle |
| 6,696,952 B2 | 2/2004 | Zirbes |
| 6,725,177 B2 | 4/2004 | David et al. |
| 6,729,910 B2 | 5/2004 | Fuller |
| 6,733,186 B2 | 5/2004 | Pfleger |
| 6,750,643 B2 | 6/2004 | Hwang et al. |
| 6,773,298 B2 | 8/2004 | Gutierrez et al. |
| 6,773,306 B2 | 8/2004 | Plishner |
| 6,784,802 B1 | 8/2004 | Stanescu |
| 6,798,956 B2 | 9/2004 | Morrison |
| 6,808,116 B1 | 10/2004 | Eslambolchi et al. |
| 6,829,427 B1 | 12/2004 | Becker |
| 6,831,443 B2 | 12/2004 | Liu |
| 6,846,115 B1 | 1/2005 | Shang et al. |
| 6,847,856 B1 | 1/2005 | Bohannon |
| 6,857,897 B2 | 2/2005 | Conn |
| 6,866,424 B2 | 3/2005 | Tanaka et al. |
| 6,871,156 B2 | 3/2005 | Wallace et al. |
| 6,881,096 B2 | 4/2005 | Brown et al. |
| 6,888,996 B2 | 5/2005 | Hwang et al. |
| 6,890,197 B2 | 5/2005 | Liebenow |

| Patent No. | Date | Name |
|---|---|---|
| 6,896,542 B2 | 5/2005 | Chang |
| 6,898,368 B2 | 5/2005 | Colombo et al. |
| 6,900,629 B2 | 5/2005 | Hwang et al. |
| 6,902,433 B1 | 6/2005 | Hashimoto et al. |
| 6,910,917 B2 | 6/2005 | Chen |
| 6,913,481 B2 | 7/2005 | Marshall et al. |
| 6,915,050 B2 | 7/2005 | Koyasu et al. |
| 6,917,763 B1 | 7/2005 | Au et al. |
| 6,921,284 B2 | 7/2005 | Sirichai et al. |
| 6,923,689 B2 | 8/2005 | Xue et al. |
| 6,924,781 B1 | 8/2005 | Gelbman |
| 6,924,997 B2 | 8/2005 | Chen et al. |
| 6,961,675 B2 | 11/2005 | David |
| 6,968,994 B1 | 11/2005 | Ashwood Smith |
| 6,971,895 B2 | 12/2005 | Sago et al. |
| 6,973,243 B2 | 12/2005 | Koyasu et al. |
| 6,975,242 B2 | 12/2005 | Dannenmann et al. |
| 6,979,223 B2 | 12/2005 | Chen |
| 6,992,567 B2 | 1/2006 | Cole et al. |
| 6,999,028 B2 | 2/2006 | Egbert |
| 7,014,100 B2 | 3/2006 | Zierolf |
| 7,014,500 B2 | 3/2006 | Belesimo |
| 7,016,726 B1 | 3/2006 | Picardo et al. |
| 7,018,242 B2 | 3/2006 | Brown et al. |
| 7,024,089 B2 | 4/2006 | Weinert et al. |
| 7,027,704 B2 | 4/2006 | Frohlich et al. |
| 7,028,087 B2 | 4/2006 | Caveney |
| 7,028,202 B2 | 4/2006 | Long et al. |
| 7,038,135 B1 | 5/2006 | Chan et al. |
| 7,044,949 B2 | 5/2006 | Orszulak et al. |
| 7,046,899 B2 | 5/2006 | Colombo et al. |
| 7,062,139 B2 | 6/2006 | Shang |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,096,077 B2 | 8/2006 | Price et al. |
| 7,102,520 B2 | 9/2006 | Liu et al. |
| 7,123,810 B2 | 10/2006 | Parrish |
| 7,132,641 B2 | 11/2006 | Schulz et al. |
| 7,140,782 B2 | 11/2006 | Frohlich et al. |
| 7,151,455 B2 | 12/2006 | Lindsay et al. |
| 7,158,031 B2 | 1/2007 | Tuttle |
| 7,158,033 B2 | 1/2007 | Forster |
| 7,160,143 B2 | 1/2007 | David et al. |
| 7,165,728 B2 | 1/2007 | Durrant et al. |
| 7,168,975 B2 | 1/2007 | Kuo |
| 7,170,393 B2 | 1/2007 | Martin |
| 7,173,345 B2 | 2/2007 | Brandt et al. |
| 7,193,422 B2 | 3/2007 | Velleca et al. |
| 7,194,180 B2 | 3/2007 | Becker |
| 7,205,898 B2 | 4/2007 | Dixon et al. |
| 7,207,846 B2 | 4/2007 | Caveney et al. |
| 7,210,858 B2 | 5/2007 | Sago et al. |
| 7,217,152 B1 | 5/2007 | Xin et al. |
| 7,221,277 B2 | 5/2007 | Caron et al. |
| 7,221,284 B2 | 5/2007 | Scherer et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,234,944 B2 | 6/2007 | Nordin et al. |
| 7,243,837 B2 | 7/2007 | Durrant et al. |
| 7,247,046 B1 | 7/2007 | Wu |
| 7,252,538 B2 | 8/2007 | Garrett et al. |
| 7,253,735 B2 | 8/2007 | Gengel et al. |
| 7,265,674 B2 | 9/2007 | Tuttle |
| 7,275,970 B2 | 10/2007 | Hoshina |
| 7,285,007 B2 | 10/2007 | Barna |
| 7,294,786 B2 | 11/2007 | Aldereguia et al. |
| 7,297,018 B2 | 11/2007 | Caveney et al. |
| 7,297,028 B2 | 11/2007 | Daikuhara et al. |
| 7,298,266 B2 | 11/2007 | Forster |
| 7,298,330 B2 | 11/2007 | Forster |
| 7,298,946 B2 | 11/2007 | Mueller |
| 7,306,489 B2 | 12/2007 | Werthman et al. |
| 7,307,408 B2 | 12/2007 | Porcu et al. |
| 7,318,744 B2 | 1/2008 | Kuo |
| 7,319,397 B2 | 1/2008 | Chung et al. |
| 7,327,278 B2 | 2/2008 | Dannenmann et al. |
| 7,336,883 B2 | 2/2008 | Scholtz |
| 7,349,605 B2 | 3/2008 | Noonan et al. |
| 7,352,285 B2 | 4/2008 | Sakama et al. |
| 7,352,289 B1 | 4/2008 | Harris |
| 7,354,298 B2 | 4/2008 | James |
| 7,356,208 B2 | 4/2008 | Becker |
| 7,411,500 B2 | 8/2008 | Hamerly et al. |
| 7,468,669 B1 | 12/2008 | Beck et al. |
| 7,504,945 B2 | 3/2009 | Cox et al. |
| 7,757,936 B2 | 7/2010 | Aguren et al. |
| 7,772,975 B2 | 8/2010 | Downie et al. |
| 7,782,202 B2 | 8/2010 | Downie et al. |
| 2001/0008390 A1 | 7/2001 | Berquist et al. |
| 2001/0027055 A1 | 10/2001 | Laity et al. |
| 2001/0039140 A1 | 11/2001 | Fasold et al. |
| 2002/0071394 A1 | 6/2002 | Koziy et al. |
| 2002/0086584 A1 | 7/2002 | Liu |
| 2002/0090858 A1 | 7/2002 | Caveney |
| 2002/0092347 A1 | 7/2002 | Niekerk et al. |
| 2003/0021580 A1 | 1/2003 | Matthews |
| 2003/0061393 A1 | 3/2003 | Steegmans et al. |
| 2003/0100217 A1 | 5/2003 | Wu |
| 2003/0100218 A1 | 5/2003 | Tsai et al. |
| 2003/0148654 A1 | 8/2003 | Kan |
| 2003/0154273 A1 | 8/2003 | Caveney |
| 2003/0154276 A1 | 8/2003 | Caveney |
| 2003/0162414 A1 | 8/2003 | Schulz et al. |
| 2003/0211782 A1 | 11/2003 | Esparaz et al. |
| 2004/0041714 A1 | 3/2004 | Forster |
| 2004/0052471 A1 | 3/2004 | Colombo et al. |
| 2004/0114879 A1 | 6/2004 | Hiereth et al. |
| 2004/0117515 A1 | 6/2004 | Sago et al. |
| 2004/0123998 A1 | 7/2004 | Berglund et al. |
| 2004/0149736 A1 | 8/2004 | Clothier |
| 2004/0184747 A1 | 9/2004 | Koyasu et al. |
| 2004/0253874 A1 | 12/2004 | Plishner |
| 2005/0032415 A1 | 2/2005 | Sakamoto |
| 2005/0052174 A1 | 3/2005 | Angelo et al. |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0111491 A1 | 5/2005 | Caveney |
| 2005/0215119 A1 | 9/2005 | Kaneko |
| 2005/0224585 A1 | 10/2005 | Durrant et al. |
| 2005/0231325 A1 | 10/2005 | Durrant et al. |
| 2005/0232636 A1 | 10/2005 | Durrant et al. |
| 2005/0259930 A1 | 11/2005 | Elkins, II et al. |
| 2005/0260884 A1 | 11/2005 | Yueh |
| 2005/0280511 A1 | 12/2005 | Yokoyama et al. |
| 2006/0039136 A1 | 2/2006 | Probasco et al. |
| 2006/0042984 A1 | 3/2006 | Suzuki |
| 2006/0044148 A1 | 3/2006 | Daniels et al. |
| 2006/0091207 A1 | 5/2006 | Chang |
| 2006/0148279 A1 | 7/2006 | German et al. |
| 2006/0153517 A1 | 7/2006 | Reagan et al. |
| 2006/0166546 A1 | 7/2006 | Ashizawa et al. |
| 2006/0206246 A1 | 9/2006 | Walker |
| 2006/0232419 A1 | 10/2006 | Tomioka et al. |
| 2006/0233506 A1 | 10/2006 | Noonan et al. |
| 2006/0257092 A1 | 11/2006 | Lu et al. |
| 2006/0267778 A1 | 11/2006 | Gengel et al. |
| 2006/0275007 A1 | 12/2006 | Livingston et al. |
| 2006/0282529 A1 | 12/2006 | Nordin |
| 2006/0286856 A1 | 12/2006 | Sakamoto |
| 2006/0292311 A1 | 12/2006 | Kilburn et al. |
| 2007/0013487 A1 | 1/2007 | Scholtz et al. |
| 2007/0015410 A1 | 1/2007 | Siemon et al. |
| 2007/0023525 A1 | 2/2007 | Son et al. |
| 2007/0032124 A1 | 2/2007 | Nordin et al. |
| 2007/0055470 A1 | 3/2007 | Pietrzyk et al. |
| 2007/0059975 A1 | 3/2007 | Walsh |
| 2007/0116411 A1 | 5/2007 | Benton et al. |
| 2007/0117450 A1 | 5/2007 | Truxes |
| 2007/0120684 A1 | 5/2007 | Utaka et al. |
| 2007/0152828 A1 | 7/2007 | Mohalik |
| 2007/0155223 A1 | 7/2007 | Huang et al. |
| 2007/0176745 A1 | 8/2007 | Gibson et al. |

| | | | | | | |
|---|---|---|---|---|---|---|
| 2007/0196058 | A1 | 8/2007 | Lee et al. | JP | 2004152543 | 5/2004 |
| 2007/0205897 | A1 | 9/2007 | Forster | JP | 2004245963 | 9/2004 |
| 2007/0216534 | A1 | 9/2007 | Ferguson et al. | JP | 2004247090 | 9/2004 |
| 2007/0236355 | A1 | 10/2007 | Flaster et al. | JP | 2004247134 | 9/2004 |
| 2007/0238343 | A1 | 10/2007 | Velleca et al. | JP | 2004264901 | 9/2004 |
| 2007/0241439 | A1 | 10/2007 | Chung et al. | JP | 2004265624 | 9/2004 |
| 2007/0247284 | A1 | 10/2007 | Martin et al. | JP | 2004265860 | 9/2004 |
| 2008/0003867 | A1 | 1/2008 | Wu | JP | 2004265861 | 9/2004 |
| 2008/0021766 | A1 | 1/2008 | McElwaine et al. | JP | 2004266886 | 9/2004 |
| 2008/0032546 | A1 | 2/2008 | Xuan et al. | JP | 2004317737 | 11/2004 |
| 2008/0045075 | A1 | 2/2008 | Caveney et al. | JP | 2004349184 | 12/2004 |
| 2008/0090451 | A1 | 4/2008 | Feldman | JP | 2004361896 A | 12/2004 |
| 2008/0100456 | A1 | 5/2008 | Downie et al. | JP | 2005018175 | 1/2005 |
| 2008/0100467 | A1 | 5/2008 | Downie et al. | JP | 2005033857 | 2/2005 |
| 2008/0106415 | A1 | 5/2008 | Sellew et al. | JP | 2005050581 | 2/2005 |
| 2008/0139306 | A1 | 6/2008 | Lutnick et al. | JP | 2005084162 | 3/2005 |
| 2008/0220721 | A1 | 9/2008 | Downie et al. | JP | 2005086901 | 3/2005 |
| 2008/0240724 | A1 | 10/2008 | Aguren | JP | 2005087135 | 4/2005 |
| 2009/0032577 | A1 | 2/2009 | Aguren et al. | JP | 2005092107 | 4/2005 |
| 2009/0079544 | A1 | 3/2009 | Noble | JP | 2005134125 | 5/2005 |
| 2009/0096581 | A1 | 4/2009 | Macauley et al. | JP | 2005216698 | 8/2005 |
| 2009/0224039 | A1 | 9/2009 | Hause et al. | JP | 2005234620 A | 9/2005 |
| 2009/0240945 | A1 | 9/2009 | Aronson | JP | 2005302403 | 10/2005 |
| 2009/0261955 | A1 | 10/2009 | Moore et al. | JP | 2005315980 | 11/2005 |
| 2010/0080554 | A1 | 4/2010 | Aguren | JP | 2005339983 | 12/2005 |
| | | | | JP | 2005341738 A | 12/2005 |

FOREIGN PATENT DOCUMENTS

| | | | | | |
|---|---|---|---|---|---|
| DE | 19920452 | 11/2000 | JP | 2006054118 | 2/2006 |
| DE | 10244304 B3 | 3/2004 | JP | 2006101630 A | 4/2006 |
| DE | 10249414 | 5/2004 | JP | 2006245983 | 9/2006 |
| DE | 102006030077 A1 | 1/2008 | JP | 2006279650 | 10/2006 |
| EP | 1455550 A2 | 9/2004 | JP | 2007087849 | 4/2007 |
| EP | 1696680 A | 8/2006 | JP | 2007088957 | 4/2007 |
| GB | 2347508 A | 9/2000 | JP | 2007158993 | 6/2007 |
| GB | 2371211 A | 7/2002 | JP | 2007189774 | 7/2007 |
| JP | 03242795 | 10/1991 | JP | 2007221400 | 8/2007 |
| JP | 04039483 | 2/1992 | WO | 03098175 A1 | 11/2003 |
| JP | 04174406 | 6/1992 | WO | 2004030154 A2 | 4/2004 |
| JP | 8191257 A | 7/1996 | WO | 2004061511 A2 | 7/2004 |
| JP | 2001069625 A | 3/2001 | WO | 2005069203 A2 | 7/2005 |
| JP | 2001099946 | 4/2001 | WO | 2006/063023 A1 | 6/2006 |
| JP | 2002264617 | 9/2002 | WO | 2008000656 A1 | 1/2008 |
| JP | 2003148653 | 5/2003 | WO | 2008/075123 A1 | 6/2008 |
| JP | 2003172827 | 6/2003 | WO | 2008076235 A1 | 6/2008 |
| JP | 2003229215 | 8/2003 | | | |
| JP | 2003284213 A | 10/2003 | | | |
| JP | 2004038583 A | 2/2004 | | | |
| JP | 2004039389 | 2/2004 | | | |
| JP | 2004142500 | 5/2004 | | | |

OTHER PUBLICATIONS

Japanese Office Action for patent application 2009-541316 mailed Jan. 10, 2012, 10 pages.

Examination Report for European patent application 09740228.3-2415 mailed Mar. 13, 2012, 12 pages.

RFID SYSTEMS AND METHODS FOR OPTICAL FIBER NETWORK DEPLOYMENT AND MAINTENANCE

CROSS-REFERENCE TO RELATED APPLICATION

This application is a continuation-in-part of U.S. patent application Ser. No. 11/638,812 filed on Dec. 14, 2006, now U.S. Pat. No. 7,760,094, which application is incorporated by reference herein.

TECHNICAL FIELD

The present invention relates to optical-fiber-based communication systems and networks, and particularly to systems and methods of deploying and maintaining and/or provisioning service and/or locating faults in optical fiber networks using radio-frequency identification (RFID) systems and methods.

TECHNICAL BACKGROUND

Optical Networks

The typical optical fiber network (OFN) includes one or more central offices (COs), one or more remote nodes (RNs) connected to the COs by corresponding optical fiber links, a number of network interface devices (NIDs) coupled to respective RNs by corresponding optical fiber links, and a number of termination points coupled to the NIDs by additional optical fiber links. There are a number of different types of OFNs, including long-haul networks that interconnect major metropolitan areas, regional networks that interconnect smaller cities to the long-haul backbone, metropolitan networks that interconnect central offices located within a city, enterprise networks that connect central offices to the buildings of large or small companies, and access networks that connect residential and business subscribers to central offices.

These networks have a variety of architectures, but each has common characteristics in that they comprise an interconnected set of electronic equipment, cables, hardware, and components. For example, in access networks, there are a variety of broadband network architectures, which are described in more detail for illustration purposes. One general type of broadband access OFN is called an active point-to-point architecture, which includes the Home Run Fiber (HRF) and Active Star Ethernet (ASE). Another general type of broadband access OFN is called a passive point-to-multipoint architecture, which includes the Passive Optical Network (PON). A PON has no active components between the CO and the termination location to which the service is delivered.

Because of the different termination options for a broadband access OFN, for simplicity the abbreviated expression "fiber to the x" (FTTx) has been adopted, wherein the "x" represents the particular termination point. The termination point may be, for example, a "premise," a home, the "curb," or a "node." Thus, in the acronym-intensive language of OFNs, a PON architecture used to provide service to one or more homes is abbreviated as FTTH-PON. The details of the particular FTTx network architecture used depends on the termination point and the service goals of the network, as well as on network cost and the existing optical fiber related infrastructure ("outside plant" or OSP). In other OFN arrangements, some of the OFN components are located inside COs or inside other buildings and structures.

The deployment and maintenance of an OFN is an equipment-intensive and labor-intensive undertaking. A network service provider that receives the various components for the network from one or more manufacturers typically installs an OFN. The various OFN components (e.g., cabinets, terminals, enclosures, patch panel ports, optical fiber cable, optical fiber cable connectors, hardware, equipment, etc.) must be received, installed, inventoried, and maintained in an organized manner. After installation, the service provider must provide service to its customers and locate and correct any faults that occur in the network. Each of these operations (deployment, maintenance, provisioning, and fault location) requires the service operator to know and understand what OFN components are deployed in the network, as well as their location and particular capabilities.

In OFN deployment, there is the need to positively identify and characterize the OFN components. This applies to the cabling (aerial or buried) as well as to the other aforementioned OFN components. Currently, this process is carried out by visual identification, using foot markers printed on outside cable jackets, and color-coding and labeling of connectors, ports, enclosures, etc. During the initial installation as well as during operations and maintenance, significant time is spent associating the various OFN components and their characteristics to an inventory database, which is updated manually. Besides the extra time spent, there is a high risk of errors due to misidentification, database entry errors or failures to correctly update the database.

An OFN is typically deployed over a relatively large geographical area, with the optical fiber cables and other OFN components being installed either below ground or above ground. Thus, the ability to quickly locate and identify the various network components and obtain information about their installation and operating status can provide significant labor and cost savings with regard to deploying and maintaining the OFN, and can increase OFN uptime.

Radio-frequency Identification

Radio-frequency identification (RFID) is a remote recognition technique that utilizes RFID tags having microcircuits adapted to store information and perform basic signal processing. The stored information is retrievable via RF communication between the RFID tag and a RFID tag reader. The typical RFID system utilizes a RFID tag reader (e.g., handheld) that when brought sufficiently close to a RFID tag is able to read a RFID tag signal emitted by the tag, usually in response to an interrogation signal from the RFID tag reader. One form of RFID tag relies on the interrogation signal from the RFID reader to provide power to the tag. Other forms of RFID tags have internal power sources.

The data encoded into a RFID tag can generally be written at a distance, and some types of RFID tags can be re-written multiple times. Each RFID application has its own unique issues and circumstances that require the RFID system to be engineered accordingly.

In view of the above-described issues associated with the deployment and maintenance of OFNs and the benefits of RFID technology, there is a need for systems and methods that integrate RFID technology with OFNs to facilitate OFN deployment and maintenance.

SUMMARY

One aspect of the invention is a RFID method of deploying and/or maintaining and/or provisioning service and/or locating faults an optical fiber network (OFN). The method includes providing at least one RFID tag on at least one OFN component of a plurality of OFN components that constitute the OFN, and writing to at least one RFID tag using at least one RFID reader, OFN component data relating to at least one property of the corresponding OFN component. The method also includes recording and storing the OFN component data in an OFN-component-data database unit. The method further includes automatically updating the OFN-component-data database by reading OFN component data from the at least one RFID tag using the one or more RFID tag readers. In an example embodiment of the method, the one or more RFID tag readers are mobile and are adapted to be taken within a read range of the at least one RFID tag affixed to the at least one OFN component.

Another aspect of the invention is a RFID system for deploying and/or maintaining and/or provisioning service and/or locating faults in an OFN. The system includes at least one RFID tag affixed to at least one OFN component of a plurality of OFN components that constitute the OFN, wherein the at least one RFID tag affixed to the at least one OFN component contains OFN component data that relates to at least one property of the OFN component. The system also includes at least one mobile RFID tag reader adapted to be taken within a read range of the at least one RFID tag affixed to the at least one OFN component and read the OFN component data from the at least one RFID tag. The system further includes an OFN component data database unit adapted to receive and store OFN component data read by the at least one RFID tag reader. The system also includes the ability to automatically update the OFN-component-data database according to the OFN component data read from the at least one RFID tag.

Another aspect of the invention is a RFID system for deploying and/or maintaining and/or provisioning service and/or locating faults in an optical fiber network (OFN) that is optically coupled to a central office (CO). The system includes at least one feeder-cable RFID tag fixed to a feeder cable that is optically coupled to the CO, with the at least one feeder-cable RFID tag having feeder-cable data relating to one or more properties of the feeder cable. The system also includes at least one local convergence point (LCP) RFID tag fixed to a local convergence point (LCP) that is operably connected to the feeder cable, with the at least one LCP RFID tag having LCP data relating to one or more properties of the LCP. The system further includes at least one distribution-cable RFID tag fixed to a distribution cable that is operably coupled to the LCP, with the at least one distribution-cable RFID tag having distribution-cable data relating to one or more properties of the distribution cable. The system also includes at least one network access point (NAP) RFID tag fixed to a NAP that is operably coupled to the LCP via the distribution cable, with the at least one NAP RFID tag having NAP data relating to one or more properties of the NAP. The system additionally includes at least one network interface device (NID) RFID tag fixed to a NID that is operably coupled to the LCP via a drop cable, with the at least one NAP RFID tag having NID data relating to one or more properties of the NID. The system further includes one or more mobile RFID tag readers adapted to be taken within a read range of the at least one RFID tag affixed to the at least one OFN component and read at least one of the feeder-cable RFID tags, the LCP RFID tags, the distribution-cable RFID tags, the NAP RFID tags, and the NID RFID tags, and provide corresponding feeder-cable data, LCP data, distribution-cable data, NAP data, and NID data. The system also includes an OFN component database unit adapted to receive and store the feeder-cable data, the LCP data, the distribution-cable data, the NAP data and the NID data. The system also preferably includes the ability to automatically update the OFN-component-database according to the OFN component data read by the one or more mobile RFID tag readers.

Additional features and advantages of the invention will be set forth in the following detailed description, and in part will be readily apparent to those skilled in the art from that description or recognized by practicing the invention as described herein, including the following detailed description, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 15 shows an example of a more detailed interactive map of the LCP and its components as displayed when the LCP icon in the OFN-RFID map of FIG. 14 is clicked on.

DETAILED DESCRIPTION

Reference is now made to present preferred embodiments, examples of which is/are illustrated in the accompanying drawings. Whenever possible, the same reference numbers or letters are used throughout the drawings to refer to the same or like parts.

The term "OFN component" as used herein is generally any component used in any type of OFN, and includes but is not limited to: a feeder cable, a distribution cable, a drop cable, a network access point (NAP), an enclosure, a splice box, a cabinet, a terminal, a patch panel, a patch cord, a fiber connector, an optical splitter, a splitter module, a coupler, an optical amplifier, a wavelength multiplexer, a wavelength demultiplexer, an optical line terminal, a filter, a light source, an optical receiver, an optical transmitter, an intrafacility cable, a local convergence point (LCP), a network interface device (NID), a fiber distribution frame (FDF), an equipment module, or any other OFN-related hardware, including fiber-related hardware.

In the discussion below, the term "data" is used in the singular and represents a collection of one or more pieces of information. The term "RFID tag data" refers to data stored in or to be stored in a RFID tag, which data contains at least one property of the corresponding OFN component associated with the RFID tag.

Also, the term "electromagnetic signals" as used to describe the signals communicated between a RFID tag and a RFID reader includes free-space radio waves as well as magnetic inductive coupling.

Figure 1:
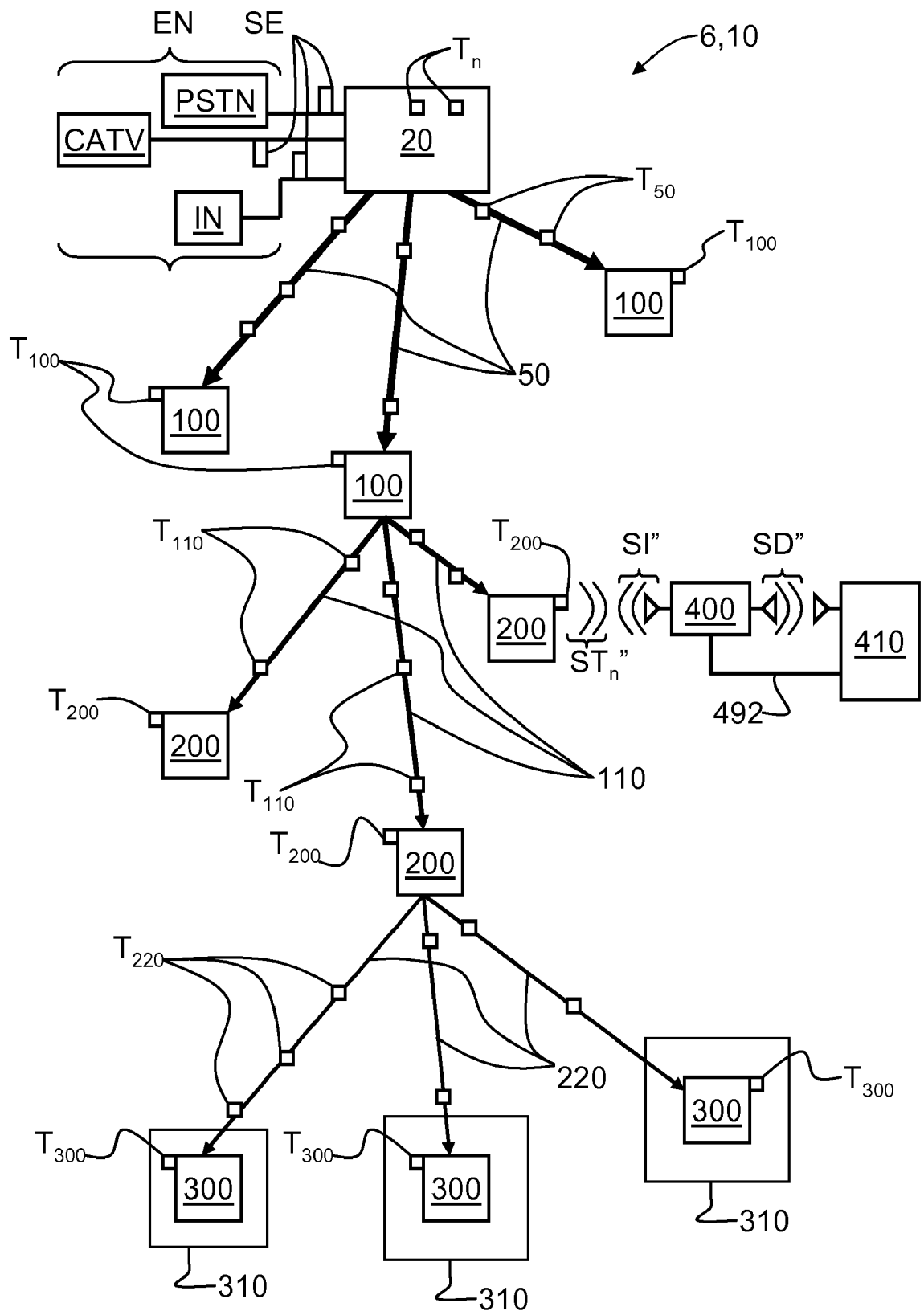
FIG. 1 is a general schematic diagram of an example embodiment of an OFN-RFID system according to the present invention, wherein the OFN is shown in the form of an FTTx-PON.

For the sake of convenience, the following is a list of the acronyms used in this application:
OFN=optical fiber network
CO=central office
RFID=radio-frequency identification.
PON=passive optical network.
FTTx="fiber-to-the-x," where "x" is the fiber cable endpoint.
LCP=local convergence point
NAP=network access point
NID=network interface device
GPS=global positioning system
OLT=optical line terminal
OSP=outside plant
GUI=graphical user interface
FDF=fiber distribution frame
dB=decibels The OFN-RFID System FIG. 1 is a schematic diagram of an example embodiment of an OFN-RFID system 6 according to the present invention. OFN-RFID system 6 is interfaced with one or more components $C_n$ of an OFN 10 via one or more RFID tags $T_n$, as described below. OFN-RFID system 6 is adapted to facilitate deploying and/or maintaining an OFN 10 by a service provider and their service personnel. OFN 10 as presented in FIG. 1 is in the form of a FTTx-PON for the sake of illustration. It will be understood by those skilled in the art that the present invention is generally applicable to all of the different types of active and passive OFNs and their respective physical plants.

Figure 2:
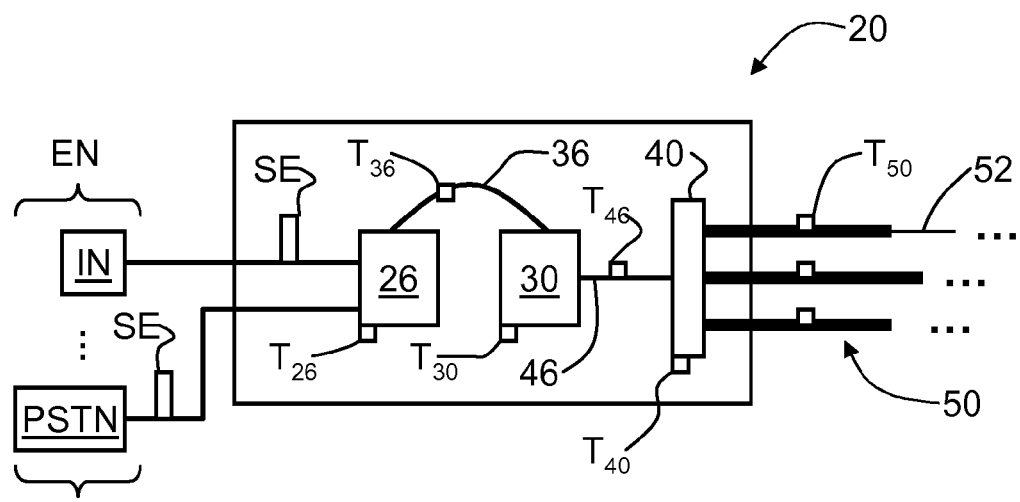
FIG. 2 is a detailed schematic diagram of an example embodiment of the central office (CO) of the OFN-RFID system of FIG. 1.

With reference to FIG. 1, OFN 10 includes one or more COs 20, which is the main switching facility of the OFN. OFN 10 is shown with a single CO 20 for ease of illustration. Coupled to CO 20 are a number of external networks EN, such as for example the Internet IN for data and video services, and a public switched telephone network (PSTN) for telephone services, and a cable TV network (CATV) for entertainment video services. External networks EN provide CO 20 with external network signals SE that are distributed via the operation of the CO to select user sites (subscribers) of the OFN. FIG. 2 is a schematic diagram of an example embodiment of CO 20 that includes a number of OFN components adapted to take incoming external network signals SE and establish temporary connections to select optical fibers in the OFN in order provide the external network signals to the OFN subscribers. CO 20 includes, for example, an optical line terminal (OLT) 26 that interfaces with the external networks EN. OLT 26 is adapted to process external signals SE and send them to a fiber distribution frame (FDF) 30 via a cross-connect patch cord 36. FDF 30 is connected to a fiber entrance cabinet 40 via an intrafacility cable 46. Fiber entrance cabinet 40 is connected to the outside cable plant (OSP), i.e., feeder cables 50 and the rest of the OFN, as discussed below. Alternatively, fiber entrance cabinet 40 is connected to feeder cables 50 that in turn connect to another CO 20, in order to allow the signals SE to be interconnected among multiple COs 20. The cables 50 may include splice boxes, enclosures, manholes, optical amplifiers, repeaters, and the like, that allow the cable distances to span long enough distances for metropolitan interoffice networks, regional networks, and long-haul networks.

With reference again to FIG. 1, OFN 10 also includes at least one feeder cable 50, with each feeder cable optically coupled at one end to CO 20 and at the opposite end to a local convergence point (LCP) 100. Feeder cable 50 may have over 100 optical fibers 52.

OFN 10 also includes one or more distribution cables 110 operably coupled to a given LCP 100, with each distribution cable including one or more optical fibers 112. Note that feeder cable(s) 50 and distribution cable(s) 110 may be either buried or supported above ground.

Figure 3:
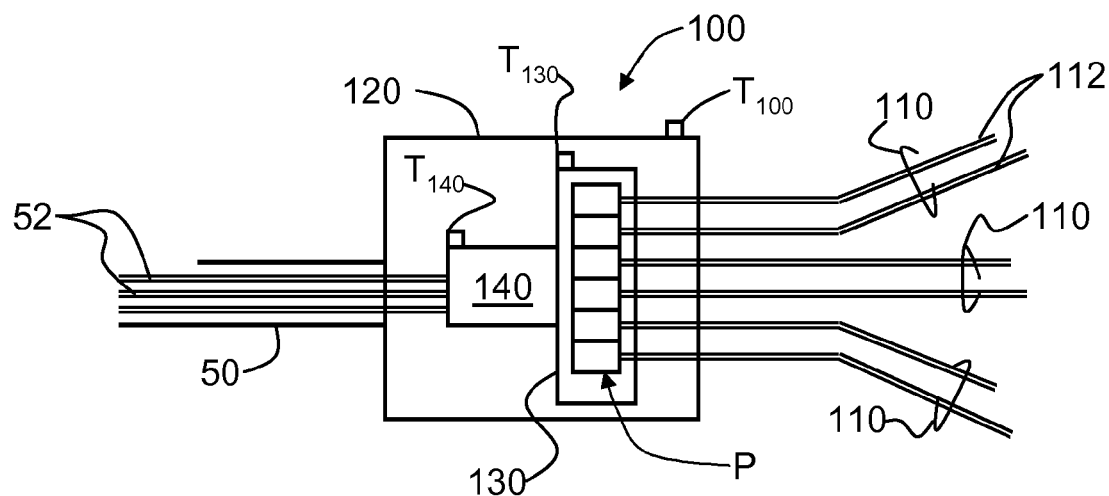
FIG. 3 is a detailed schematic diagram of an example embodiment of a local convergence point (LCP) of the OFN-RFID system of FIG. 1.

FIG. 3 is a schematic diagram of an example LCP 100. LCP 100 includes a distribution cabinet 120 that houses a splitter module 130 having a number of ports P. A typical number of ports is either 16, 32 or 64. Splitter module 130 includes one or more splitters (not shown). LCP 100 also includes a patch panel 140 that terminates optical fibers 52 in feeder cable 50 and facilitates access thereto by splitter module 130.

With reference again to FIG. 1, OFN 6 includes at least one network access point (NAP) 200, with each optically connected to a corresponding LCP 100 via a corresponding distribution cable 110. OFN 6 also includes one or more drop cables 220 operably coupled to NAP 200. Each optical drop cable 220 includes one or more optical fibers 222.

Figure 4:
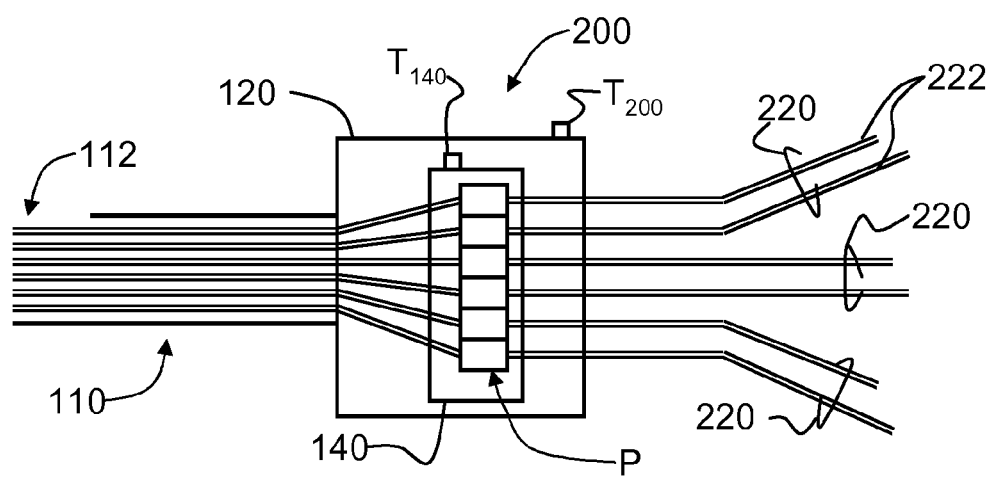
FIG. 4 is a detailed schematic diagram of an example embodiment of a network access point (NAP) of the OFN-RFID system of FIG. 1.

FIG. 4 is a schematic diagram of an example embodiment of NAP 200. NAP 200 includes a distribution cabinet 120 that houses passive optical components, such as patch panel(s) 140 that includes splice trays and/or connector ports for receiving a preconnectorized distribution cable 110 and a preconnectorized drop cable 220. For the sake of illustration, connector ports P are shown. Patch panel 140 serves to distribute incoming signals from the individual optical fiber 112 of distribution cable 110 to one or more drop cables 220 and the individual optical fibers 222 therein. Other example embodiments of NAPs 200 may include other OFN components, such splitters 130, making them similar to LCPs 100 of FIG. 3.

With reference again to FIG. 1, each drop cable 220 is optically coupled to a network interface device (NID) 300. NID 300 (also called a network interface unit, or NIU) is located at a user site 310. NID 300 includes electrical and/or optical components (not shown) that enables a user at user site 310 to connect to OFN 6.

RFID Tags in OFN-RFID System

With continuing reference to FIG. 1, OFN-RFID system 6 includes at least one RFID tag provided to (e.g., fixed or otherwise attached to) at least one OFN component, and at least one RFID tag reader 400 adapted to read RFID tags. OFN-RFID system 6 also includes an OFN component data database unit 410 (hereinafter, "database unit") in operable communication with RFID tag reader 400. To associate RFID tags with given components, the reference letter $T_n$ is used to represent a RFID tag, where the subscript "n" is the reference number of the corresponding OFN component, generally referred by the reference letter $C_n$.

Figure 5:
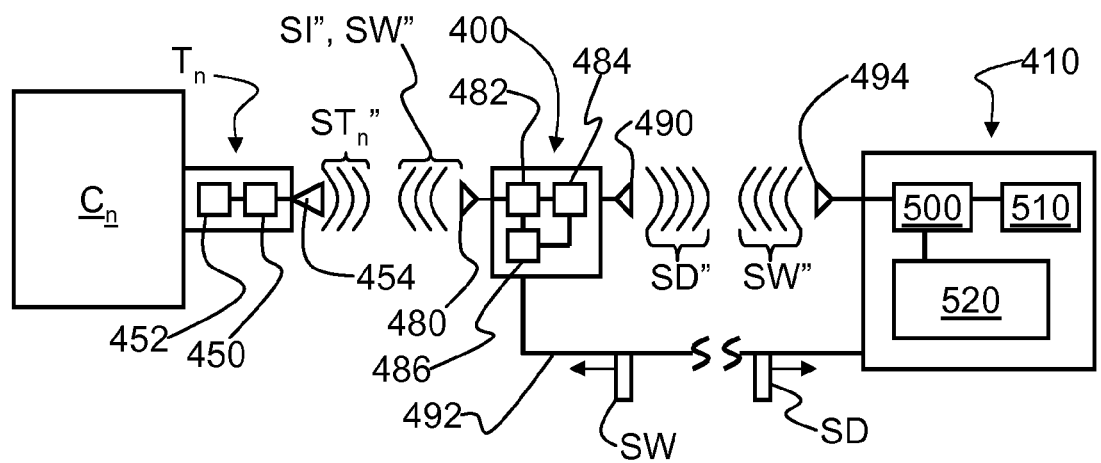
FIG. 5 is a detailed schematic diagram of an example embodiment of a RFID tag attached to a general OFN component, and also showing the details of an example RFID tag reader and an example database unit in operable communication therewith.

FIG. 5 is a detailed schematic diagram of an example embodiment of a RFID tag $T_n$ attached to OFN component $C_n$ (e.g., RFID tag $T_{200}$ attached to NAP 200 as shown in FIG. 1 and in FIG. 4). FIG. 5 also shows details of RFID tag reader 400 and Database unit 410. RFID tag $T_n$ includes a microcircuit 450 (e.g., in the form of a microchip) electrically connected to a memory unit 452 and to a receive/transmit antenna 454. Memory unit 452 is adapted to store information ("RFID tag data"), which includes at least one property of the associated OFN component, but more typically includes a number of such properties. Typical RFID tag data includes, for example, the type of component to which the RFID tag is affixed, the component manufacturer, the manufacturer part number, the date of component manufacture, the date of component installation, the component's operational status, component maintenance information and history, component location in the OFN (e.g., global positioning system (GPS) coordinates), a part or other identification number, and so on.

Microcircuit 450 is adapted to receive an electromagnetic RFID-tag interrogation signal SI" emitted by RFID reader via antenna 480 and to process this signal. The processing includes comparing the received interrogation signal SI" to a corresponding bit sequence stored value in memory unit 452. In an example embodiment, microcircuit 450 is adapted to use the energy in the interrogation signal to power itself If the content of the received interrogation signal SI" is confirmed, then microcircuit 450 is adapted to generate a RFID tag signal $ST_n$ representative of the stored RFID tag data and to transmit this signal to RFID reader 400 as an electromagnetic tag signal $ST_n"$ to be read by RFID tag reader 400.

In an example embodiment, one or more of the RFID tags are adapted to generate electromagnetic RFID tag signals at a frequency that is not significantly affected by soil or water, such as in the frequency range from 100 KHz to 125 KHz. This is so that the RFID tag signal can be read even though the corresponding OFN component is buried underground or covered by water. Here, the electromagnetic RFID tag signals are based on magnetic inductive coupling. Suitable RFID tags and associated RFID tag readers are available from 3M Corporation.

Also in an example embodiment, at least some of the RFID tags are adapted to generate RFID tag signals at a frequency suitable for long-range RFID-tag reading, such at the 915 MHz band or the 2.45 GHz band. Such RFID tags are best suited for aerial or aboveground OFN components, or more generally for OFN components that are not buried or otherwise obstructed by an intervening RF-frequency-absorbing medium. Suitable RFID tags are available from Alien Technologies, Inc., as Model Nos. ALL-9440 and ALL-9350.

In an example embodiment, RFID tag reader 400 and one or more of RFID tags $T_n$ are adapted with encryption capability so that the interrogation signal and the RFID tag signal can be encrypted to prevent third parties from reading or overwriting RFID tag data.

Example RFID Tag Reader

With continuing reference to FIG. 5, an example embodiment of RFID tag reader 400 includes a receive/transmit antenna 480, a signal processing circuit 482 electrically connected thereto, and a memory unit 484 electrically connected to the signal processing circuit. RFID tag reader 400 also includes other electronic components that not essential to the present invention and so are not shown. In an example embodiment, RFID tag reader 400 includes a GPS circuit 486 adapted to provide GPS data to signal processing circuit 482 and/or to memory unit 484.

Signal processing circuit 482 is adapted to generate interrogation signal SI and transmit it via antenna 480 to RFID tag $T_n$ as an electromagnetic interrogation signal SI". Signal processing circuit 482 is also adapted to write information to RFID tag $T_n$ based on information either stored in memory unit 484, entered into the RFID tag reader directly by a user, or communicated to it from database unit 410, as described below.

RFID tag reader 400 is also adapted to receive electromagnetic RFID tag signal $ST_n"$ via antenna 480, which converts this signal back to electrical RFID tag signal $ST_n$. Signal processing circuit 482 is further adapted to extract the RFID tag data from this signal and store this data in memory unit 484 and/or transmit this data to database unit 410.

Example Database Unit

In an example embodiment, RFID tag reader 400 is operably coupled to database unit 410 so that it can transmit information to and receive information from the database unit. In an example embodiment, database unit 410 includes a second transmit/receive antenna 494 used to wirelessly communicate with RFID tag reader 400, through a Wi-Fi network or through the cellular phone network, as examples. In another example embodiment, database unit 410 is operably coupled to RFID tag reader 400 via a non-wireless (e.g., an electrical or optical) communication link 492, such as an Ethernet link. In an example embodiment, RFID tag reader 400 is mobile (mounted on a vehicle or carried by service personnel) and is brought out to the field so as to be accessible to those working in the field to deploy or maintain or provision service or locate faults in the OFN 10.

Database unit 410 includes a microprocessor 500 operably connected thereto, a memory unit 510 operably coupled to the microprocessor, and a display 520 operably coupled to the microprocessor. In an example embodiment, database unit 410 is or otherwise includes a computer, such as a laptop computer, personal computer or workstation. In an example embodiment, database unit 410 is mobile (e.g., as a laptop computer or hand-held device) and is brought out to the field so as to be accessible to those working in the field to deploy or maintain OFN 10. Also in an example embodiment, database unit 410 supports a graphical user interface (GUI) so that a database-unit user can view graphical images and interact with interactive graphical images on display 520.

In an example embodiment, RFID tag reader 400 transmits RFID tag data to database unit 410 either non-wirelessly via a non-wireless data signal SD sent over communication link 492, or wirelessly via electromagnetic data signal SD". Database unit 410 then stores and processes the RFID tag data, such as described below.

Also in an example embodiment, database unit 410 either wirelessly and/or non-wirelessly transmits write information in respective information signals SW and/or (electromagnetic) signal SW" to RFID tag reader 400. The write information in signals SW or SW" is then written by RFID tag reader 400 to one or more RFID tags $T_n$ and stored therein as RFID tag data.

Microprocessor 500 in database unit 410 is adapted to process the RFID tag data to create useful information about the status of OFN 10 and OFN components $C_n$. In an example embodiment, this information is displayed on display 520. In an example embodiment, the information is represented as graphics, and further is presented by database unit 410 in the form of one or more interactive OFN-RFID maps. The OFN-RFID maps may include, for example, component inventory data, component location data, component connectivity data and/or component status data. Example interactive OFN-RFID maps for facilitating the deployment and maintenance of OFN 10 are discussed in greater detail below.

CO RFID Tags

FIG. 1 shows a number of RFID tags $T_n$ attached to different OFN components $C_n$ of OFN 10. With reference also to FIG. 2, CO 20 includes a OLT-RFID tag $T_{26}$ affixed to OLT 26. OLT RFID tag $T_{26}$ includes, for example, information relating to the manufacturer, manufacturer model number, date of installation, the last maintenance performed, what was performed during the last maintenance, what the next maintenance is and when it is scheduled, the number of PONs served by the OLT, the number of connections to external networks EN, the types of external networks served, the exact location of the OLT in the CO, communication protocols used, etc.

CO 20 also includes a patch-cord RFID tag $T_{36}$ attached to patch cord 36 and a intrafacility-cable RFID tag $T_{46}$. These RFID tags include, for example, information relating to the manufacturer, manufacturer part number, date of installation, the number of connections, type of fiber, etc.

CO 20 also includes an FDF RFID tag $T_{30}$ attached to FDF 30 and a cabinet RFID tag $T_{40}$ attached to entrance cabinet 40. These RFID tags include, for example, information relating to the manufacturer, manufacturer part number, date of installation, the number of connections, location of the frame or cabinet, etc.

Feeder Cable RFID Tags

With reference again also to FIG. 1, OFN-RFID system 6 includes a number of feeder-cable RFID tags $T_{50}$ attached to feeder cables 50. In an example embodiment, feeder-cable RFID tags $T_{50}$ are arranged along the length of each feeder cable 50 (e.g., at fixed intervals) and include information such as their respective GPS position information, the status of the feeder cable, the number of optical fibers 52 in the feeder cable, the last maintenance operation, feeder cable manufacturer, feeder cable manufacturer model number, the location and type of LCP to which the feeder cable is connected, the length of cable, the distance between cable RFID tags, etc. In another example embodiment, feeder-cable RFID tags $T_{50}$ are located at certain important locations, such as splice locations.

Feeder cable RFID tags $T_{50}$ may also include information relating to the installation of feeder cables 50, such as the planned installation destination, installation date, special instructions regarding the installation (e.g., aerial or buried cable), and the like.

LCP RFID Tags

OFN-RFID system 6 also includes a number of LCP RFID tags. In an example embodiment, a main LCP RFID tag $T_{100}$ is attached to the OSP distribution cabinet 120 and contains information relating to the general properties of LCP 100, such as the cabinet location, operational status of the LCP, manufacturer information, maintenance status, the number and type of internal OFN components, etc. A splitter-module LCP RFID tag $T_{130}$ is attached to splitter module 130.

Figure 6:
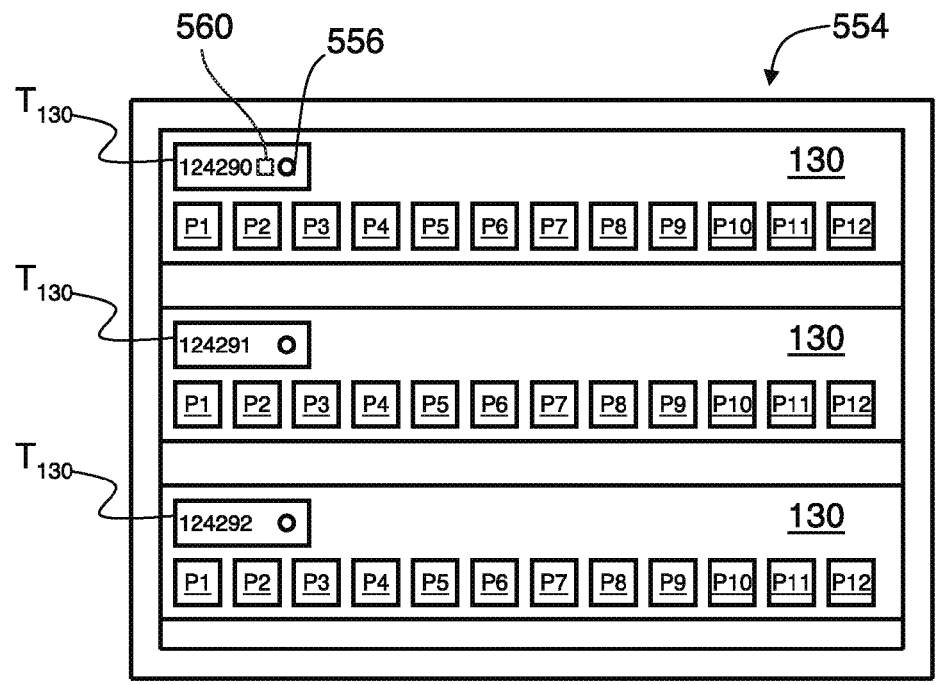
FIG. 6 is a schematic front-on view of an example splitter module rack that houses three splitter modules, wherein each splitter module includes a splitter-module RFID tag.

FIG. 6 is a detailed face-on diagram of an example splitter module rack 554 that houses three splitter modules 130. Each splitter module 130 has a number of splitter ports P. Twelve such splitter ports P1 through P12 are shown for the sake of illustrations. Other numbers of splitter ports, such as 32 and 64 are also often used. A splitter-module RFID tag $T_{130}$ is attached to each splitter module 130. In an example embodiment, each splitter module 130 also includes a conventional ID tag 556 with a tag ID number that identifies the splitter module, e.g., by its shelf location in splitter module rack 554. This conventional ID tag can be placed directly on the RFID tag $T_{130}$, as shown.

In an example embodiment, RFID tag $T_{130}$ includes a light 560 (e.g., a light-emitting diode (LED)) that activates when the particular RFID tag $T_{130}$ is interrogated by RFID tag reader 400. This helps identify which one of the RFID tags $T_{130}$ is being interrogated and read at a given time.

Table 1 below presents an example embodiment of RFID tag data stored in the splitter-module RFID tag $T_{130}$ for splitter module ID# 124290. For the sake of illustration, only the data for the first six ports P1- through P6 is shown.

TABLE 1

SPLITTER-MODULE RFID TAG DATA
Shelf ID # 124290

| | Port | | | | | |
|---|---|---|---|---|---|---|
| | P1 | P2 | P3 | P4 | P5 | P6 |
| 1310 nm Loss (dB) | 17 | 17 | 17 | 17 | 17 | 17 |
| 1550 nm Loss (dB) | 17 | 17 | 17 | 17 | 17 | 17 |
| Terminal ID | 12345 | 12345 | 12346 | 12347 | 12348 | 12349 |
| Street Name | Elm Street | Elm Street | Elm Street | Elm Street | Elm Street | Elm Street |
| Street Address | 123 | 124 | 125 | 126 | 127 | 128 |
| Pole Number | 1 | 1 | 2 | 2 | 3 | 3 |
| GPS (Lat, Long) | N30 13.477 W97 44.315 | N30 13.455 W97 44.315 | N30 13.445 W97 44.300 | N30 13.402 W97 44.269 | N30 13.380 W97 44.198 | N30 13.380 W97 44.169 |
| Other Information | None | None | Faulty port | None | Repaired Jun. 22, 2005 | None |

Table 1 includes the shelf ID number—here, ID number 124290 chosen for illustration purposes—that identifies the splitter-module RFID tag as being located in a particular shelf of splitter module rack 554. Table 1 includes the following information for each port: The 1310 nm loss (dB), the 1550 nm loss (dB), the street name served by the port, the street address served by the port, the pole number associated with the port, the GPS coordinates of the location served by the port, and "other information" that can be added to the RFID tag as needed, such as the operating status or the maintenance status. Generally speaking, data can also be written to the RFID tag via RFID reader 400 so that the data can be updated as needed. In an example embodiment, RFID tags $T_{130}$ contain default deployment data written to the RFID tag prior to the deployment of LCP 100 or the installation of splitter module 130 in the LCP.

Figure 7:
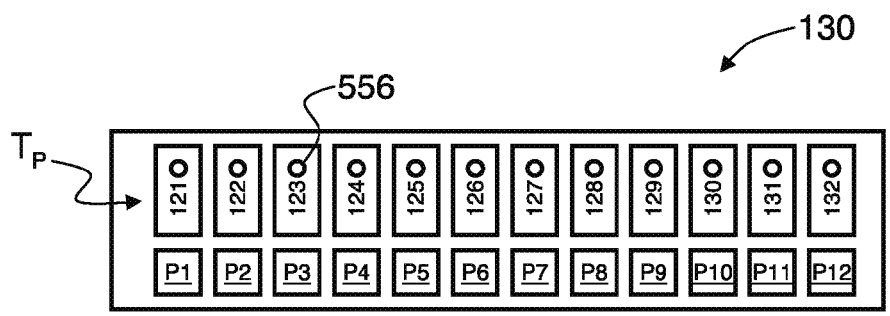
FIG. 7 is a schematic front-on view of a single splitter module of FIG. 6, showing an example embodiment wherein each port has an associated port RFID tag.

In another example embodiment illustrated in FIG. 7, each splitter module 130 includes a port RFID tag $T_P$ for each splitter port P. Port RFID tags $T_P$ contain, for example, information about the status of the corresponding port P and its connectivity.

Figure 8:
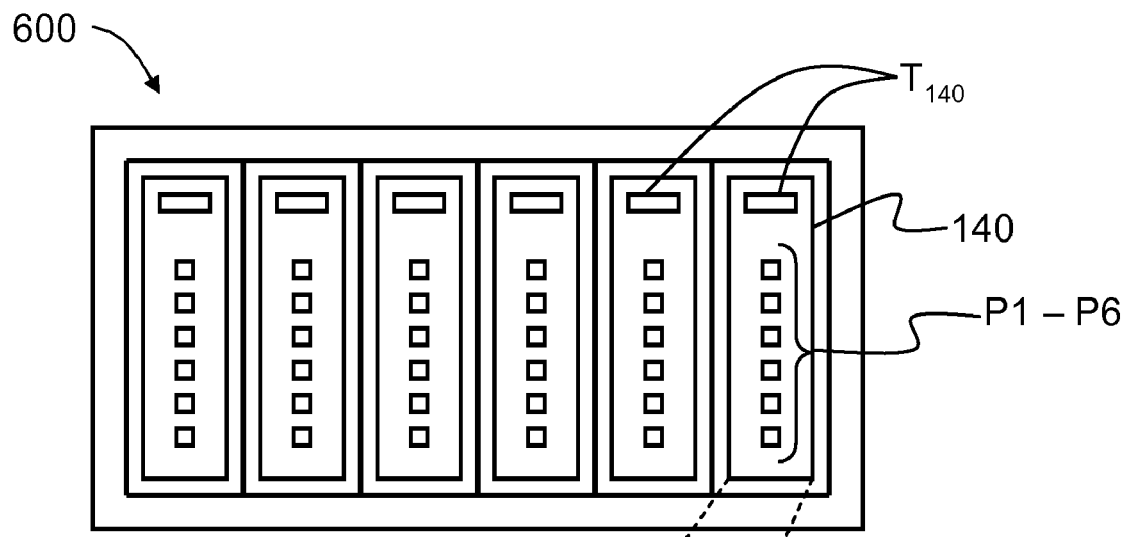
FIG. 8 is a schematic front-on view of an example patch-panel rack that houses six patch panels, wherein each patch panel includes a patch-panel RFID tag.

FIG. 8 is a detailed face-on diagram of an example patch-panel rack that includes a number of patch panels 140. Each patch panel 140 includes a patch-panel RFID tag $T_{140}$ attached thereto. As with splitter-module RFID tag $T_{130}$, patch-panel RFID tag $T_{140}$ includes in an example embodiment a light 556 activated by microcircuit 450 when the patch-panel RFID tag is interrogated by RFID tag reader 400. Patch-panel RFID tag $T_{140}$ also includes a conventional ID number that indicates the patch panel's shelf location in patch-panel rack 600.

Figure 9:
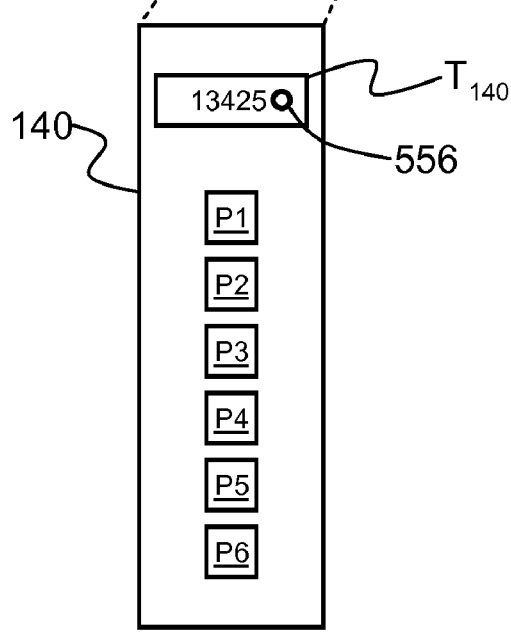
FIG. 9 is a close-up view of one of the patch panels of FIG. 8, illustrating the patch-panel ports and the patch-panel RFID tag.

FIG. 9 is a close-up front-on view of patch panel 140, showing patch-panel RFID tag $T_{140}$ and patch-panel ports P1 through P6. Table 2 below presents an example embodiment of data stored in patch-panel RFID tag $T_{140}$ for patch-panel ID # 13425 of FIG. 8.

TABLE 2

PATCH-PANEL RFID TAG DATA
PANEL ID # 13425 READ/WRITE

| PORT | LOSS (dB) | OSP LOCATION |
|------|-----------|--------------|
| P1 | 0.3 | Node 123 Forward |
| P2 | 0.3 | Node 123 Return |
| P3 | 0.3 | Spare |
| P4 | 0.3 | Spare |
| P5 | 0.3 | WALLMART |
| P6 | 0.3 | XYZ, Inc. |

Table 2 includes the patch-panel ID number—here, ID number 13425, chosen for illustration purposes. Table 2 also includes the patch-panel port number P1 through P6, the loss per port (in dB), and the OSP location information. Other information, such as building name, room number, subscriber location, street address, power levels, maintenance schedules, and the like can be included in Table 2. Alternately, it is possible to have a separate RFID tag, with one for each port number P1 through P6, that contains all of the data pertinent to its associated port.

Here, it is emphasized that the prior art approach to OFN deployment and maintenance involves obtaining such information by inspection and previous written documentation, and then documenting the updated information on paper. The paper documents are then distributed to provide information about the maintenance history of OFN components $C_n$ such as splitter module 130 and patch panel 140. With RFID tags, this paper documentation is replaced by the data written into the RFID tags, and is available instantly at the point of use and at any time it is needed.

Distribution-cable RFID Tags

With reference again to FIG. 1, OFN-RFID system 6 includes a number of distribution-cable RFID tags $T_{110}$ attached to distribution cables 110. In an example embodiment, distribution-cable RFID tags $T_{110}$ are arranged along the length of each distribution cable 110 (e.g., at fixed intervals). Distribution-cable RFID tags $T_{110}$ include information such as their respective GPS positions, the status of the distribution cable, the number of optical fibers 112 in the distribution cable, the distance between RFID tags, the last maintenance operation, the distribution-cable manufacturer, distribution-cable manufacturer model number, the location and type of LCP 100 and NAP 200 to which the distribution cable is connected, etc. In another example embodiment, distribution-cable RFID tags $T_{110}$ are located at certain important locations, such as splice locations.

Distribution-cable RFID tags $T_{110}$ may also include information relating to the installation of distribution cables 110, such as the planned installation destination, installation date, special instructions regarding the installation (e.g., aerial or buried cable), and the like.

NAP RFID Tags

OFN-RFID system 6 also includes a number of NAP RFID tags. A main NAP RFID tag $T_{200}$ is attached to the distribution cabinet 120 and contains information relating to the general properties of NAP 200, such as the cabinet location, operational status of the NAP, manufacturer information, maintenance status, the number and type of internal OFN components, etc.

The other NAP RFID tags for NAP 200 are essentially the same as those for LCP 100 since the NAP typically includes the same OFN components-namely, splitter module(s) 130 and patch panel(s) 140.

Drop-cable RFID Tags

With reference to FIG. 1, OFN-RFID system 6 includes a number of drop-cable RFID tags $T_{220}$ attached to drop cables 220. In an example embodiment, drop-cable RFID tags $T_{220}$ are arranged along the length of each drop cable 220 (e.g., at fixed intervals). Drop-cable RFID tags $T_{220}$ include information such as their respective GPS positions, the distance between successive RFID tags, the status of the drop cable, the number of optical fibers 112 in the drop cable, the last maintenance operation, the drop-cable manufacturer, drop-cable manufacturer model number, the location and type of NAP 200 and NID 300 to which the drop cable is connected, etc. In another example embodiment, drop-cable RFID tags $T_{220}$ are located at certain important locations, such as splice locations.

Drop-cable RFID tags $T_{220}$ may also include information relating to the installation of drop cables 220, such as the planned installation destination, installation date, special instructions regarding the installation (e.g., aerial or buried cable), and the like.

NID RFID Tags

OFN-RFID system 6 also includes a number of NID RFID tags. A main NID RFID tag $T_{300}$ is attached to cabinet 120 and contains information relating to the general properties of NID 300, such as the cabinet location, operational status of the NID, manufacturer information, maintenance status, the number and type of internal OFN components, etc.

Other NID RFID tags are provided to the corresponding NID OFN components in analogous fashion to the LCP RFID tags described above. In an example embodiment, the other NID RFID tags are essentially the same as those for LCP 100 in the case where the two have the same or similar OFN components.

RFID Mapping of the OFN

As discussed above, an example embodiment of the present invention involves using OFN RFID tags $T_n$ to create one or more OFN-RFID maps of OFN 10 based on the RFID tag data read from the OFN RFID tags. In one example embodiment, OFN RFID tags $T_n$ are provided with data relating to the deployment of the corresponding OFN components $C_n$ prior to OFN 10 being deployed. In one example, the OFN RFID tag data is written to the corresponding RFID tags by the OFN component manufacturer and/or by the OFN installer (service provider). For example, for cable assemblies that are factory terminated and customized for installation in a particular location, the location information can also be written in the RFID tags. RFID tags on the cable reel or cable assembly reel can also contain information about their installation destination, as required.

The OFN RFID tag data is then read from the OFN RFID tags using RFID tag reader 400 prior to or during deployment. In an example embodiment, the service provider receives materials from the OFN component supplier and scans all tagged OFN components. This information is then added to the inventory database unit of database unit 410. At this point, the service provider may choose to replace the manufacturer identification and the identification number written to the RFID tag by the manufacturer with its own identification number, which uniquely identifies this tag within its entire inventory of assets. The original identification number and the manufacturer code can be stored in the inventory database unit so that each entity can still be traced back if necessary. This enables the full capability and capacity of the manufacturing database collection to be searched to determine the characteristics and performance of the component in more detail than can be written into the RFID tag. Such manufacturing data can be retrieved remotely, for example, via the Internet or via a cellular phone network. This information can be further updated at the time of installation, to add additional details of interest to the network operator, such as the association between ports and connectors.

The OFN RFID tag data, which is collected in memory unit 510 of database unit 410, is processed via microprocessor 500 to provide a representation of the OFN RFID tag information from the various OFN RFID tags, such as an OFN map.

In an example embodiment, the information stored in the OFN RFID tags $T_n$ includes positional information (e.g., GPS coordinates) for the OFN components $C_n$. The positional information is, for example, originally provided by GPS circuit 486 and written to the OFN RFID tags $T_n$ by RFID tag reader 400 during installation of the OFN component. Service personnel can use the RFID tag reader, either mounted on vehicles or as hand-held units, at the field location to read and write the GPS and OFN component data to the associated OFN RFID tags $T_n$. Writing of GPS information can be carried out, for example, by OFN service personnel working in the field while installing, maintaining or repairing the OFN. For example, the GPS information can also be added to the RFID tag data by RFID tag reader 400 during the RFID tag reading process after OFN deployment (e.g., by OFN service personnel) and sent to the database unit along with the read RFID tag data. Updating of the RFID tag data and the database data can be done manually by service personnel or automatically by the RFID tag reader 400. This allows the map to show in detail the precise locations of the OFN components, as well as the spatial relationships between OFN components in the OFN.

In a similar manner, an OFN inventory map is created that shows the location (e.g., via GPS coordinates) and the corresponding part number for each OFN component $C_n$ in OFN 10. In an example embodiment, the OFN inventory map includes information about not only installed OFN components, but spare OFN components as well, such as availability, location, etc.

In another example embodiment, an OFN maintenance map of OFN 10 is created by writing to one or more of the OFN RFID tags $T_n$ maintenance information for the corresponding OFN components $C_n$. The maintenance map includes, for example, maintenance that needs to be performed and/or maintenance that has already been performed. By updating OFN RFID tags $T_n$ using one or more RFID tag readers 400 and transmitting the updated OFN RFID tag information from the one or more RFID tag readers to database unit 410, an updated maintenance map is established. Such an updated maintenance map can be viewed on display 520 of database unit 410 and used to plan and schedule OFN maintenance.

Figure 10:
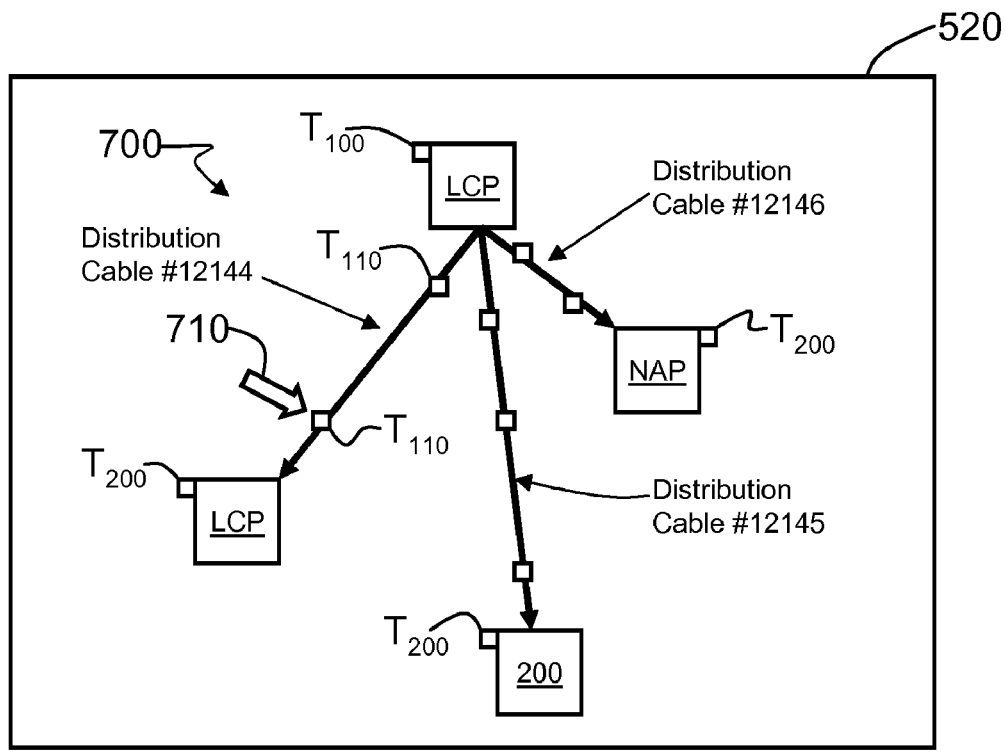
FIG. 10 shows an example embodiment of an interactive OFN-RFID map as shown on the display of the database unit.

In an example embodiment, both inventory and maintenance maps are used in combination when performing OFN maintenance, since inventory issues often arise in connection with performing OFN maintenance. FIG. 10 shows an example of an interactive OFN-RFID map 700 as shown on display 520 of database unit 410. OFN-RFID interactive map 700 shows a portion of OFN 10. The GUI functionality of database unit 410 allows a cursor 710 to be moved by a user to the various OFN components, which serve as active icons that can be "clicked on" to reveal the RFID tag information corresponding to the particular OFN component.

Figure 11:
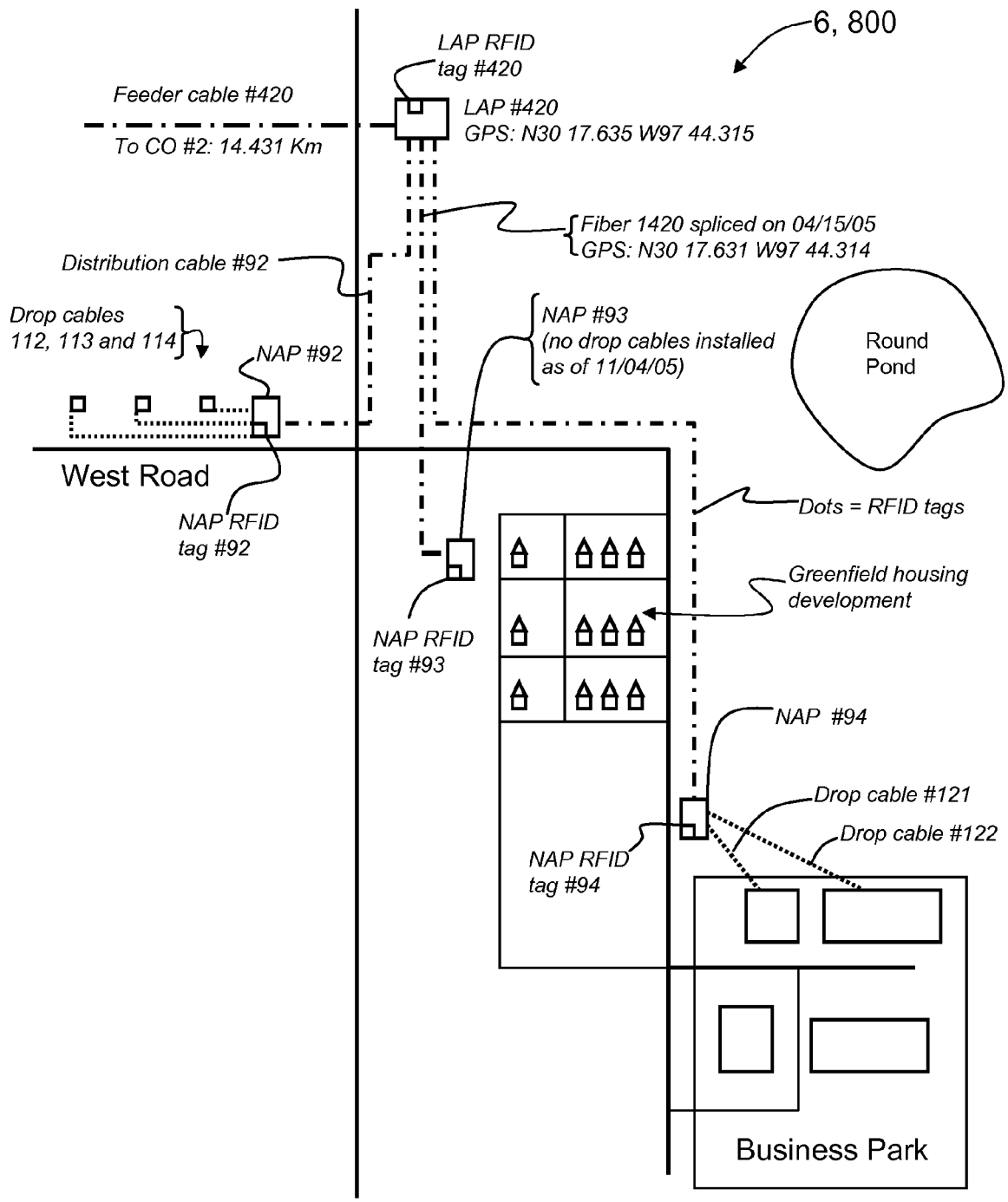
FIG. 11 illustrates an example embodiment wherein an OFN-RFID interactive map is shown along with a geographical map.

FIG. 11 illustrates an example embodiment of the present invention wherein an OFN-RFID interactive map 700 is overlaid or shown along with a standard geographical map 800 (e.g., a GPS-based map). The spatial layout of at least a portion of OFN 6 and the location of the various OFN-RFIG tags $T_n$ is viewable in the context of the local geography, which includes roads, buildings, geographic features, etc. This allows for the OFN components to be positioned on the map so that the field service personnel can easily locate the components, and can find the physical location of faulty OFN components, or can identify which OFN components are causing the fault by knowing their position on the map. Service personnel can also use the OFN component locations on the map to simplify provisioning of service to customers. It is worth emphasizing here that locating OFN components in the field is a time-consuming job. Even after a particular component is found, one may not be sure it is the correct one. The RFID tag for the particular OFN component provides the field operator with positive confirmation that they have indeed found the correct component.

Figure 12:
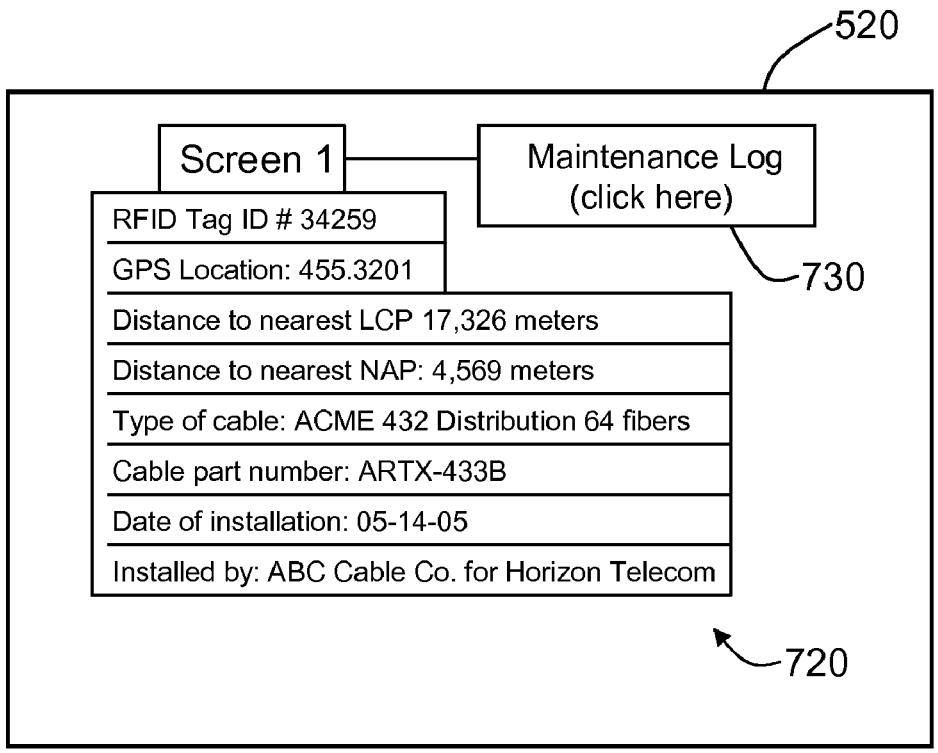
FIG. 12 shows an example information table as displayed on the database unit display when the cursor "clicks on" a distribution-cable RFID tag icon in the OFN-RFID map of FIG. 10.

FIG. 12 is an example schematic diagram of a table 720 (similar to Tables 1 and 2, set forth above) as displayed on display 520 when cursor 710 is used to click on a RFID tag $T_{100}$ icon in OFN-RFID map 700 of FIG. 10. Table 720 includes the RFID tag data of clicked-on RFID tag $T_{110}$. The example RFID tag data includes the RFID tag ID serial number, the GPS location, the distance to the nearest LCP 100, the distance to the nearest NAP 200, the type of cable, the cable part number, the date of installation, and who installed the cable. Table 720 also includes one or more active icons, such as a maintenance log icon 730 that, when clicked on, displays additional RFID tag data regarding the maintenance performed.

Figure 13:
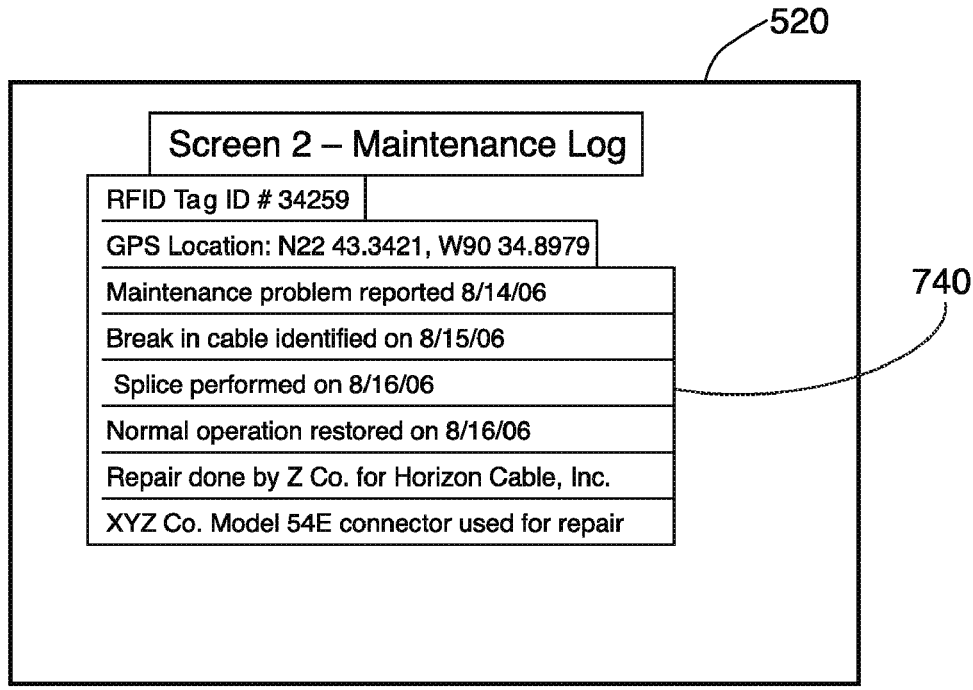
FIG. 13 shows an example maintenance log table as displayed on the database unit display when the cursor "clicks on" the maintenance log icon of the information table of FIG. 12.

FIG. 13 is an schematic diagram of an example maintenance log 740 that is displayed on display 520 when maintenance log icon 730 of FIG. 12 is clicked. Service personnel use the RFID tag data and GPS location data to locate the fault or OFN component needing maintenance, make the necessary repairs, and/or automatically write maintenance or repair data into the RFID tag $T_{110}$. Maintenance log 740 shows example maintenance RFID tag data, such as the RFID tag ID serial number, the GPS location of the RFID tag, the date a maintenance problem was reported, the nature of the problem identified, what repair was performed and when, when the system was placed back in operation, who effected the repair, and what parts were used to make the repair.

Figure 14:
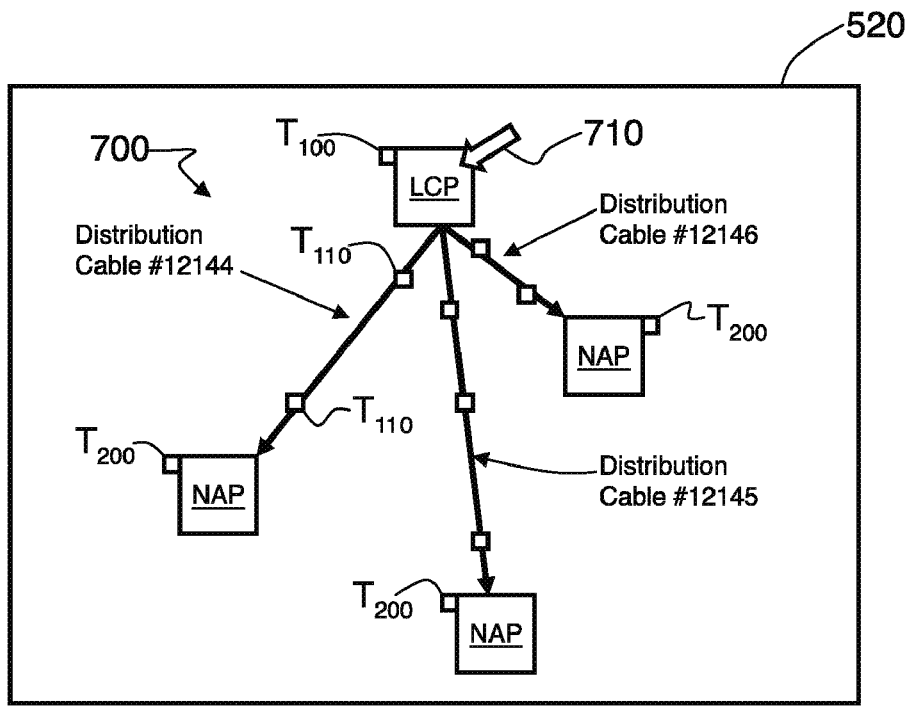
FIG. 14 shows the interactive OFN-RFID map of FIG. 10, but with the cursor moved to a LCP active icon.
Figure 15:
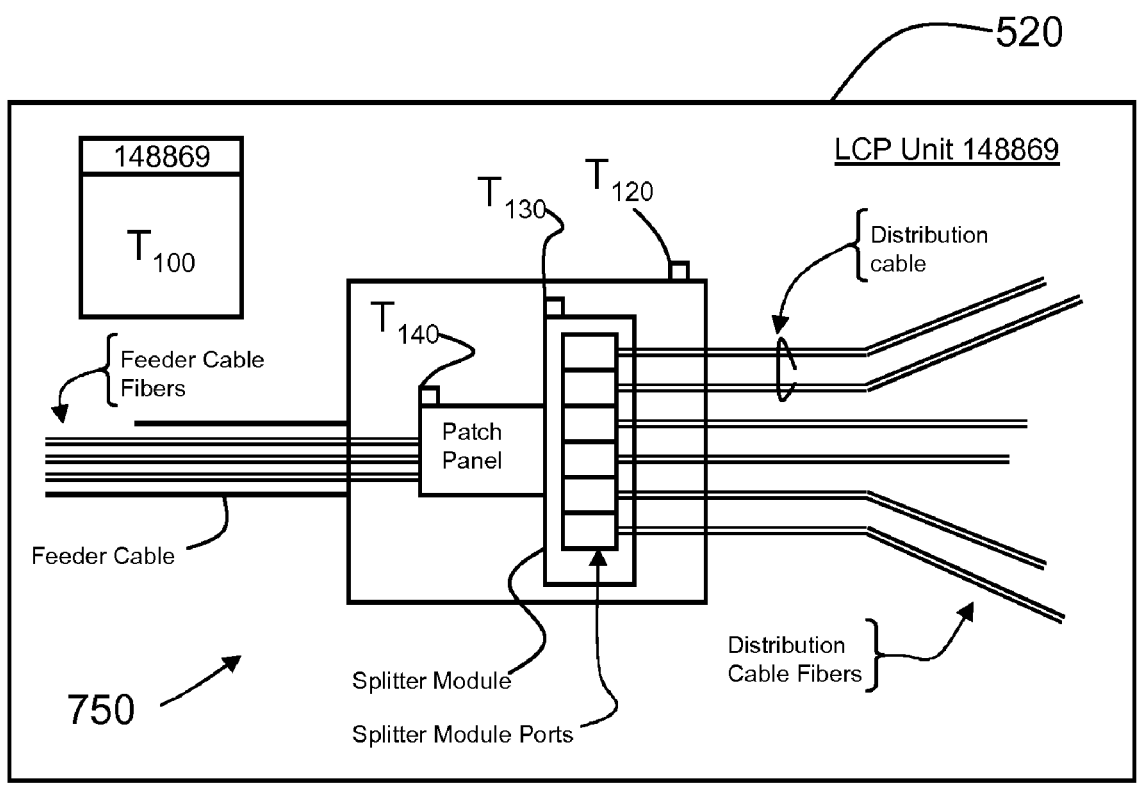

FIG. 14 shows the interactive OFN-RFID map 700 of FIG. 10, but with cursor 710 moved to the LCP 100 active icon. FIG. 15 illustrates a second interactive map 750 (adapted from FIG. 3) of LCP 100 that is displayed on display 520 when the LCP 100 icon of FIG. 14 is clicked on. Interactive map 750 shows the different OFN components of LCP 100 as described above in connection with FIG. 3.

Each of the RFID tags $T_n$ in interactive map 750 are active icons that can be clicked on to display the corresponding RFID tag data. For example, clicking on RFID tag $T_{130}$ displays Table 1 as shown and discussed above in connection with splitter module 130. Likewise, clicking on RFID tag $T_{140}$ displays Table 2 as shown and discussed above in connection with patch panel 140. Interactive map 750 also includes a general LCP RFID tag $T_{120}$ icon that can be clicked on to display general RFID tag data generally concerning the corresponding LCP 100.

As discussed above, in an example embodiment, database unit 410 is portable, allowing it to be taken into the field by those deploying or maintaining OFN 10. The RFID tag reader 400 is also portable, being mounted on a vehicle or hand-held, allowing it to be taken into the field by those deploying or maintaining OFN 10. This provides for real-time processing of OFN deployment and maintenance RFID tag data during the deployment or maintenance activity.

The automated tracking of OFN components afforded by the present invention reduces the risk of misidentification and errors that often accompany manual updates of an OFN component inventory database. The present invention also allows for automated updating of RFID tag data and associated OFN-component-data database entries. The present invention also provides for faster and more accurate installation, provisioning operations, fault location and maintenance of the OFN.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A radio-frequency identification (RFID) method of deploying and/or maintaining an optical fiber network (OFN), comprising:
   providing a plurality of RFID tags associated with a corresponding plurality of OFN components that constitute the OFN;
   writing to two or more of the plurality of RFID tags using at least one RFID reader, OFN component data relating to at least one property of the corresponding OFN component;
   recording and storing the OFN component data in an OFN-component-data database unit; and
   automatically updating the OFN-component-data database by reading OFN component data from the two or more of the plurality of RFID tags using the at least one RFID reader,
   wherein the OFN component data is read from the two or more of the plurality of RFID tags and shows a relationship among two or more of the plurality of OFN components corresponding to the two or more of the plurality of RFID tags.

2. The method of claim 1, further comprising:
   installing the OFN components in the OFN; and
   performing said providing of at least one RFID tag prior to said installing.

3. The method of claim 1, wherein the reading of the OFN component-data is performed either during or after deploying the OFN.

4. The method of claim 1, further comprising:
   including in said OFN component data a location of the corresponding OFN component either as deployed or as to be deployed in the OFN; and
   using said location data to create a spatial map of the OFN.

5. The method of claim 4, including showing the spatial map of the OFN with a geographical map having geographical features, so as to locate the OFN components relative to geographical features.

6. The method of claim 4, further comprising:
   locating at least one select OFN component based on said spatial OFN map; and
   reading the corresponding at least one RFID tag among the plurality of RFID tags associated with the at least one select OFN component.

7. The method of claim 1, further comprising:
   including inventory data in the OFN component data; and
   using said inventory data to create an inventory map of the OFN.

8. The method of claim 1, wherein the OFN includes an optical fiber cable having a length, and including:
   positioning RFID tags along the length of the optical fiber cable; and
   including as OFN component data the relative locations of the RFID tags along the optical fiber cable using global positioning system (GPS) coordinates.

9. The method of claim 1, wherein the plurality of OFN components includes at least one patch panel, and further comprising:
   including, in at least one patch-panel RFID tag corresponding to the at least one patch panel, at least one OFN component data element from the group of OFN component data elements comprising: port identification, loss per port, and connectivity for each port.

10. The method of claim 1, wherein the plurality of OFN components includes at least one splitter module, and further comprising:
    including, in at least one splitter-module RFID tag corresponding to the at least one splitter module, at least one OFN component data element from the group of OFN component data elements comprising: shelf ID, port identification, loss data at a given wavelength, terminal ID, street name, street address, pole number, and GPS coordinates.

11. The method of claim 1, wherein the at least one RFID reader is mobile, and further comprising:
    bringing the at least one mobile RFID reader within a read range of the at least one RFID tag among the plurality of RFID tags affixed to the at least one OFN component and reading the OFN component data from the at least one RFID tag.

12. The method of claim 1,
    wherein providing at least one RFID tag further comprises providing a plurality of RFID tags, each of the plurality of tags associated with one of the plurality of OFN components in the OFN;
    wherein the writing to at least one RFID tag further comprises writing the OFN component data to a plurality of RFID tags using the RFID reader, each of the plurality of RFID tags associated with a corresponding OFN component of the plurality of OFN components and
wherein the OFN component data relates to the at least one property of the corresponding OFN component; and
wherein the OFN component data shows a relationship among two or more of the plurality of OFN components.

13. The method of claim 1, further comprising:
using the OFN component data to identify which of the OFN components are associated with a particular subscriber.

14. The method of claim 1, further comprising:
including in the OFN component data GPS coordinates indicating a location of the corresponding OFN component.

15. A radio-frequency identification (RFID) system for deploying and/or maintaining an optical fiber network (OFN), comprising:
a plurality of RFID tags, each of the plurality of RFID tags affixed to a corresponding one of a plurality of OFN components in the OFN, wherein two or more of the plurality of RFID tags each contain OFN component data that relates to at least one property of the corresponding OFN component to which a respective one of the two or more of the plurality of RFID tags is affixed;
at least one mobile RFID tag reader adapted to be taken within a read range of the two or more of the plurality of RFID tags and adapted to read the OFN component data from the two or more of the plurality of RFID tags; and
an OFN component data database unit adapted to receive and store OFN component data read by the at least one mobile RFID tag reader,
wherein the OFN component data read from the two or more of the plurality of RFID tags shows a relationship among two or more of the plurality of OFN components corresponding to the two or more of the plurality of RFID tags.

16. The RFID system of claim 15, wherein the OFN components include one or more OFN components selected from the group of OFN components comprising: a feeder cable, a distribution cable, a drop cable, a splitter, a splitter module, a network access point (NAP), an enclosure, a cabinet, a terminal, a patch panel, a patch cord, a splice box, a fiber connector, a coupler, an optical amplifier, a wavelength multiplexer, a wavelength demultiplexer, an optical line terminal (OLT), a filter, a light source, an optical receiver, an optical transmitter, an intrafacility cable, a local convergence point (LCP), a network interface device (NID), a fiber distribution frame (FDF), and a fiber equipment module.

17. The RFID system of claim 16, wherein one of the OFN components is a splitter module, and wherein the OFN component data for the splitter module includes at least one data element selected from the group of data elements comprising: a shelf location, a port identification, a loss at a given wavelength, a terminal identification, a street name, a street address, and GPS coordinates.

18. The RFID system of claim 16, wherein one of the OFN components is a patch panel having a number of optical fiber connection ports, and wherein the OFN component data for the patch panel include one or more data elements selected from the group of data elements comprising: GPS coordinates, a shelf location, a port identification, a loss for each port, a destination for each port, and a status of each port.

19. The RFID system of claim 15, wherein:
the database unit includes a microprocessor having graphical user interface (GUI) capability and adapted to process the OFN component data stored in the database unit; and
a display operably coupled to the microprocessor and adapted to interactively display the OFN component data as processed by the microprocessor.

20. The RFID system of claim 15, wherein the at least one mobile RFID tag reader is adapted to read RFID tag signals from RFID tags located underground.

21. The RFID system of claim 15, wherein the at least one mobile RFID tag reader automatically updates the OFN component data database unit.

22. The system of claim 15,
wherein one of the plurality of OFN components is a cable having a length; and
wherein the OFN component data for the cable includes one or more data elements selected from a group of data elements comprising:
global positioning (GPS) coordinates, a distance between successive RFID tags on the cable, the length of the cable, a type of a fiber in the cable, a number of optical fibers in the cable, a status of the cable, information relating to a last performed maintenance operation, a manufacturer of the cable, a model number of the cable, a location of the OFN component to which the cable is connected, and a type of the OFN component to which the cable is connected.

23. A radio-frequency identification (RFID) system for deploying and/or maintaining an optical fiber network (OFN) that is optically coupled to a central office (CO), comprising:
at least one feeder-cable RFID tag fixed to a feeder cable that is optically coupled to the CO, with the at least one feeder-cable RFID tag having feeder-cable data relating to one or more properties of the feeder cable;
at least one local convergence point (LCP) RFID tag fixed to a local convergence point (LCP) that is operably connected to the feeder cable, with the at least one LCP RFID tag having LCP data relating to one or more properties of the LCP;
at least one distribution-cable RFID tag fixed to a distribution cable that is operably coupled to the LCP, with the at least one distribution-cable RFID tag having distribution-cable data relating to one or more properties of the distribution cable;
at least one network access point (NAP) RFID tag fixed to a NAP that is operably coupled to the LCP via the distribution cable, with the at least one NAP RFID tag having NAP data relating to one or more properties of the NAP;
at least one network interface device (NID) RFID tag fixed to a NID that is operably coupled to the LCP via a drop cable, with the at least one NID RFID tag having NID data relating to one or more properties of the NID;
one or more mobile RFID tag readers adapted to read at least one of the at least one feeder-cable RFID tag, the at least one LCP RFID tag, the at least one distribution-cable RFID tag, the at least one NAP RFID tag, and the at least one NID RFID tag, and provide corresponding feeder-cable data, LCP data, distribution-cable data, NAP data, and NID data; and
an OFN component database unit adapted to receive and store the feeder-cable data, the LCP data, the distribution-cable data, the NAP data and the NID data.

24. The RFID system of claim 23, wherein the at least one mobile RFID tag reader is configured to automatically update the OFN-component-data database.

* * * * *

UNITED STATES PATENT AND TRADEMARK OFFICE
CERTIFICATE OF CORRECTION

PATENT NO. : 8,264,355 B2  
APPLICATION NO. : 12/248374  
DATED : September 11, 2012  
INVENTOR(S) : David Robert Kozischek et al.

Page 1 of 1

It is certified that error appears in the above-identified patent and that said Letters Patent is hereby corrected as shown below:

On the Title Page, item (63) should read:

(63) Continuation-in-Part of application No. 11/638,812, filed on Dec. 14, 2006, now Pat. No. 7,760,094.

Signed and Sealed this
Sixteenth Day of July, 2013

Teresa Stanek Rea
*Acting Director of the United States Patent and Trademark Office*